April 17, 1934. O. U. ZERK 1,955,161
MULTIPLEX SYSTEM OF AUTOMATIC LUBRICATION
Filed Oct. 4, 1929 20 Sheets-Sheet 1
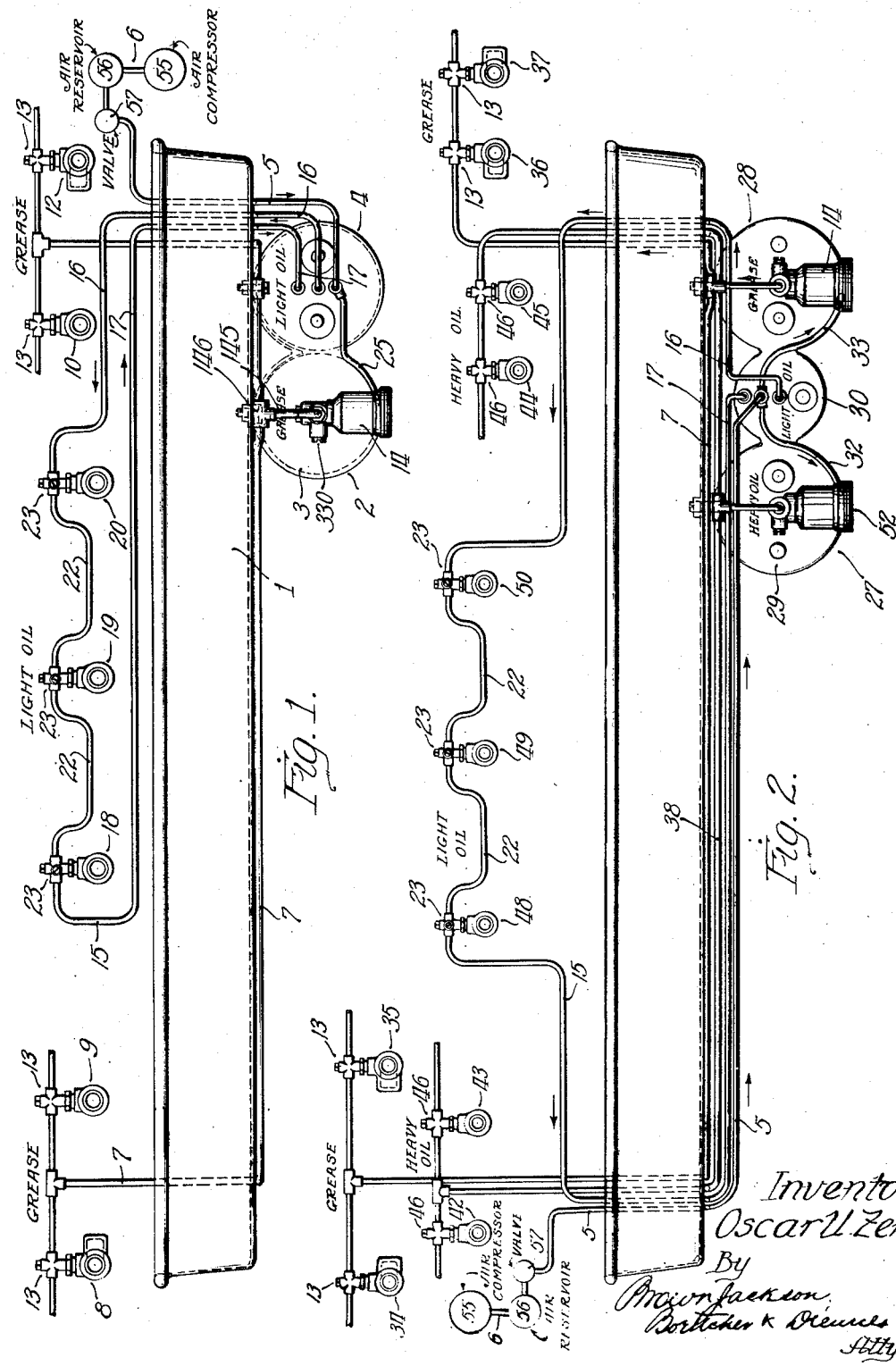

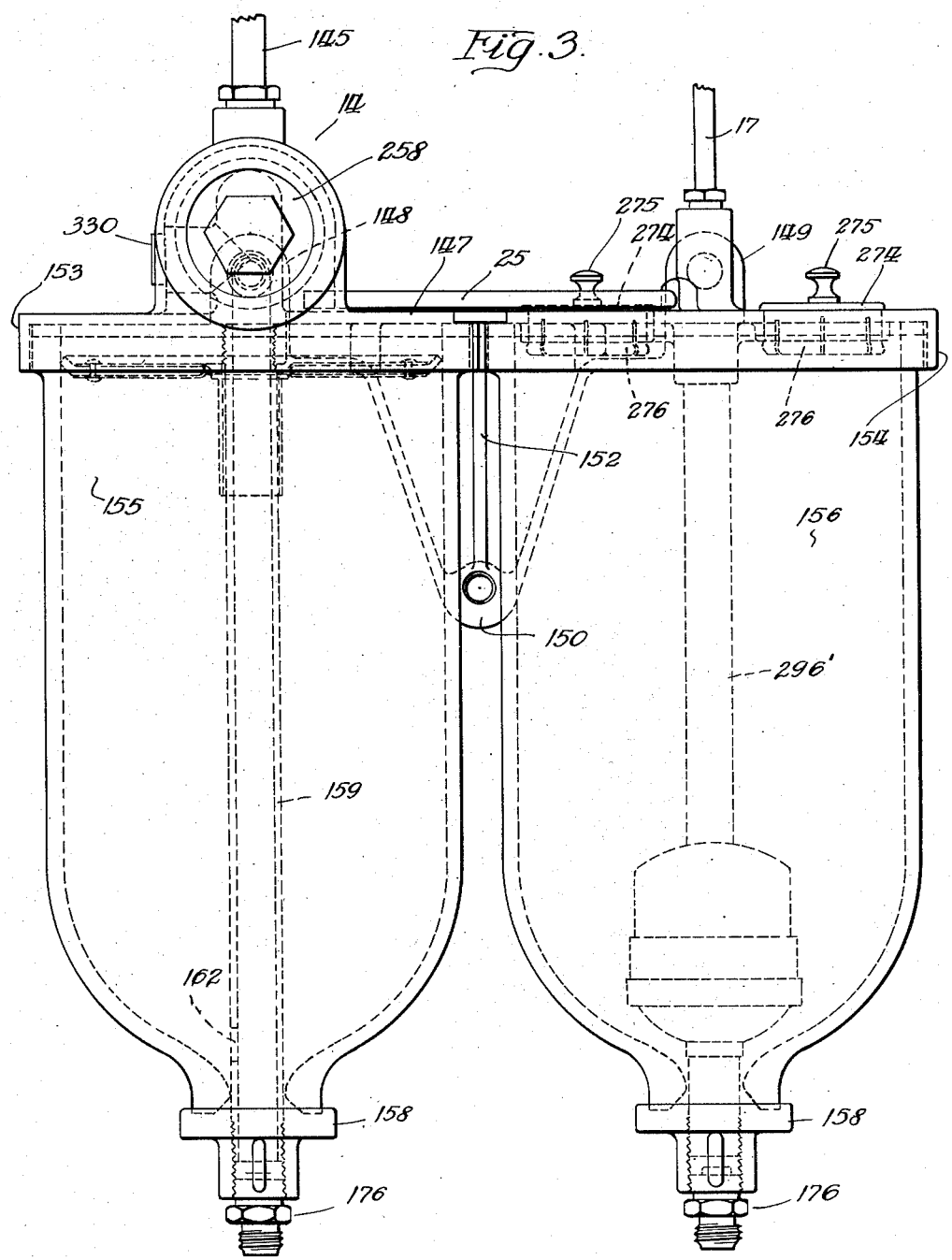

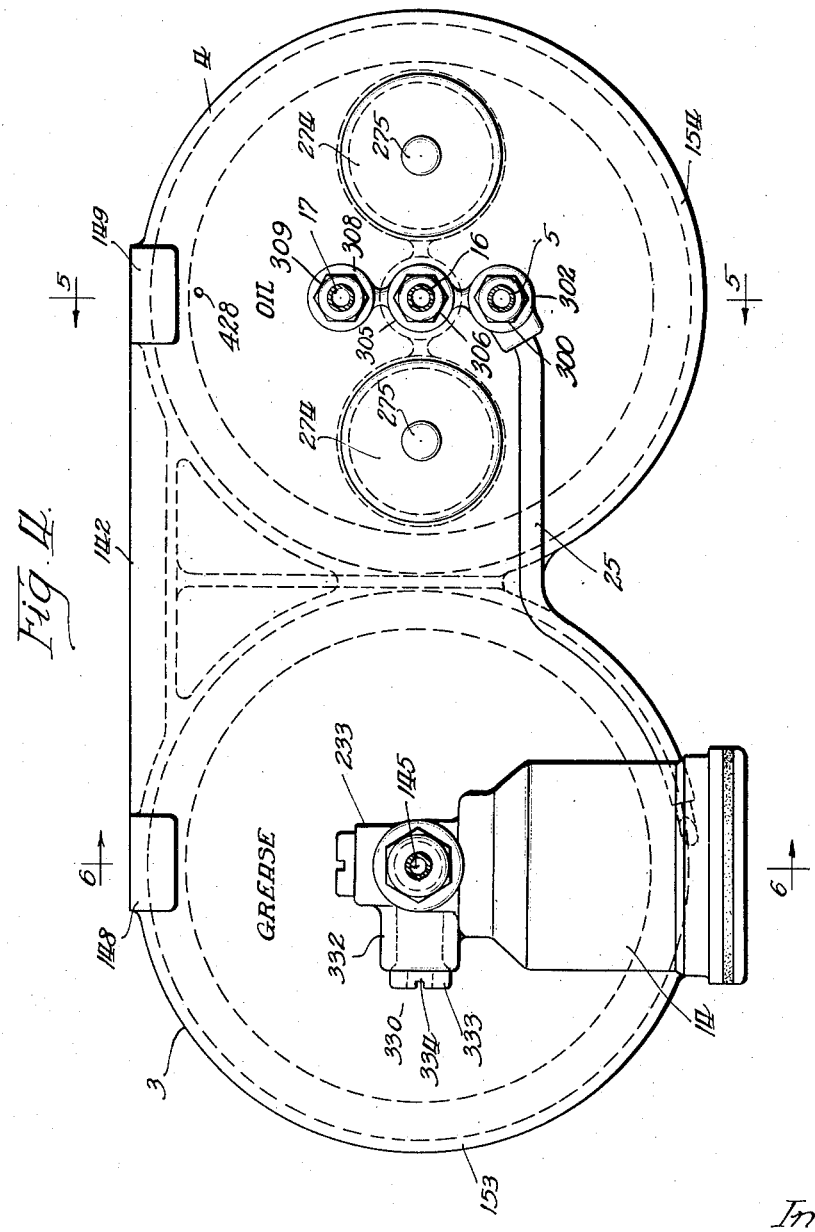

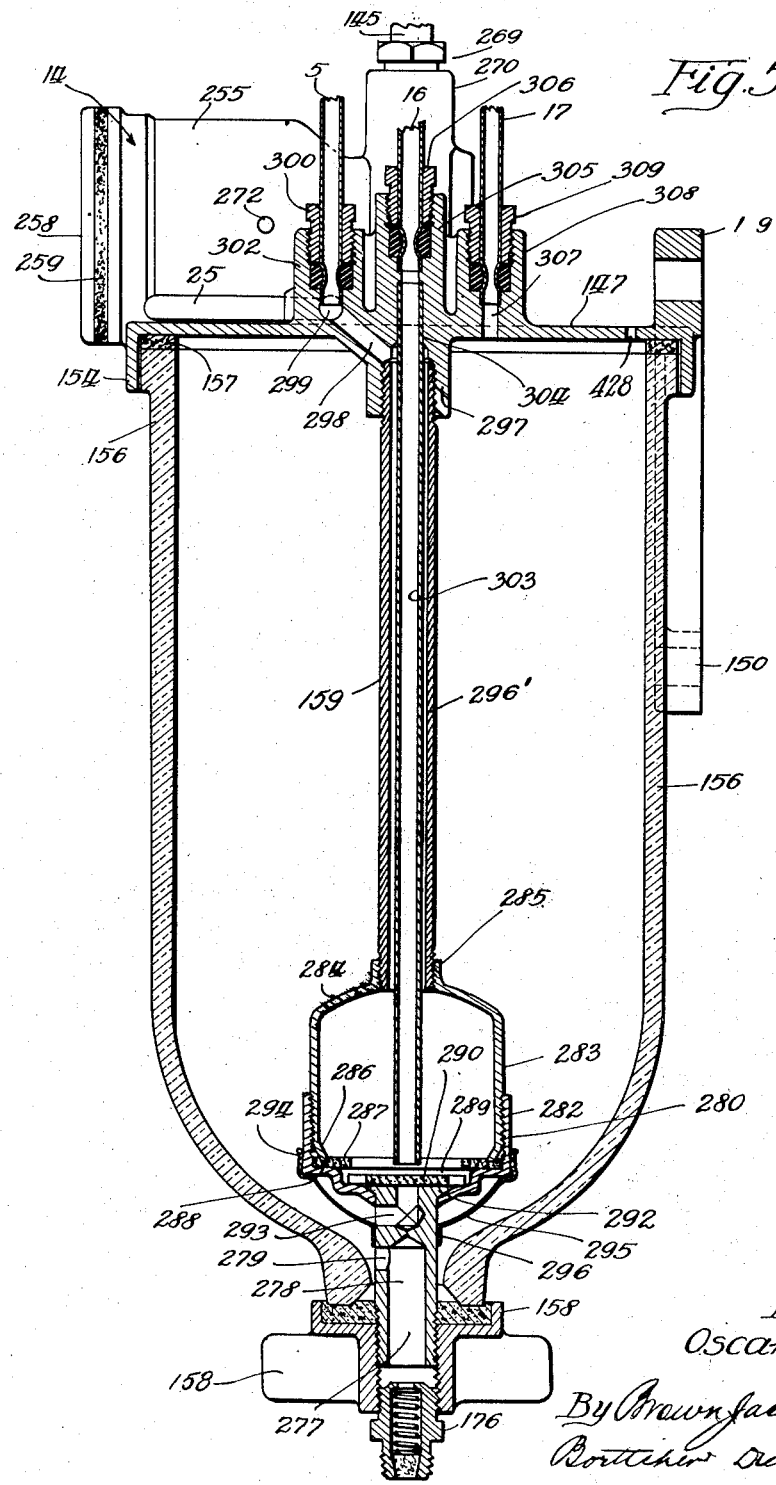

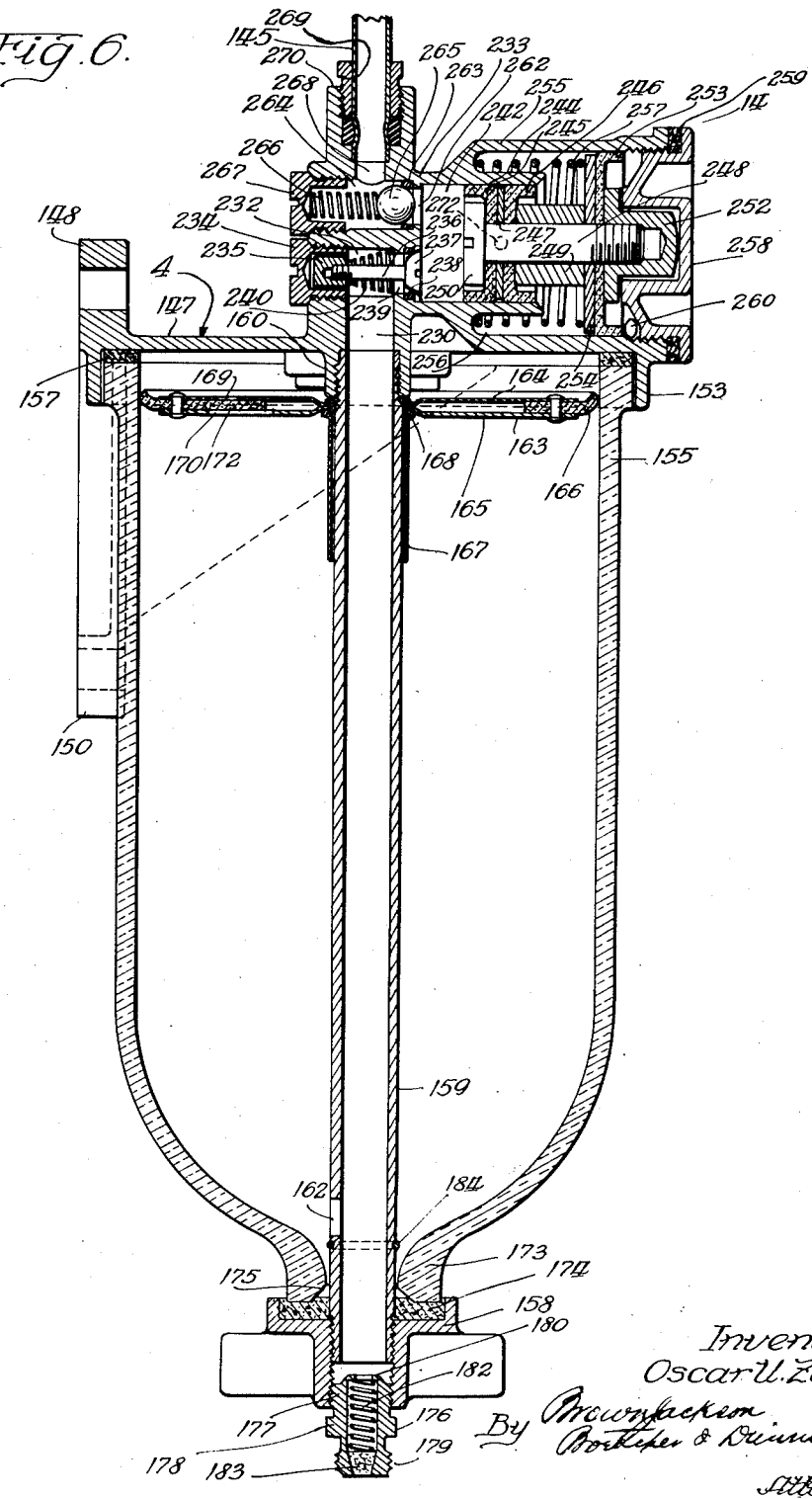

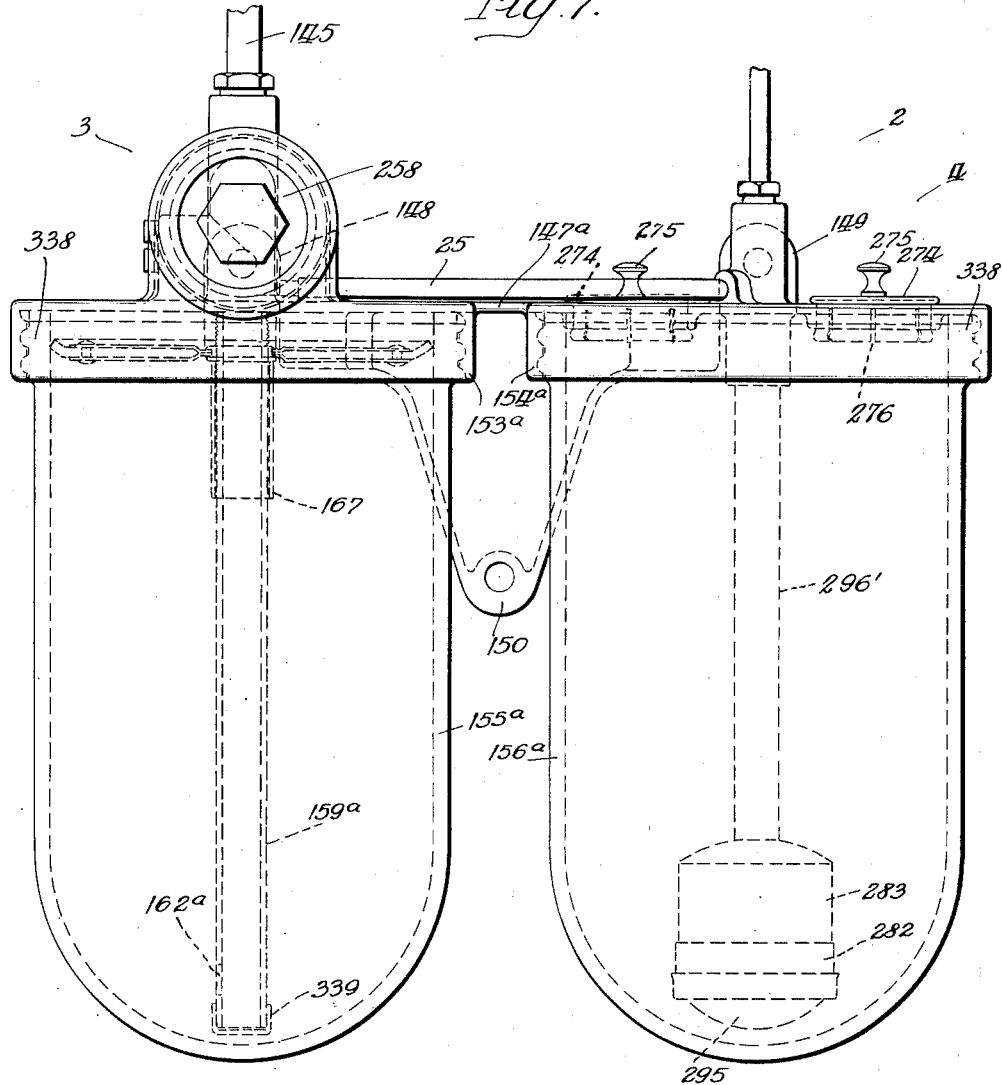

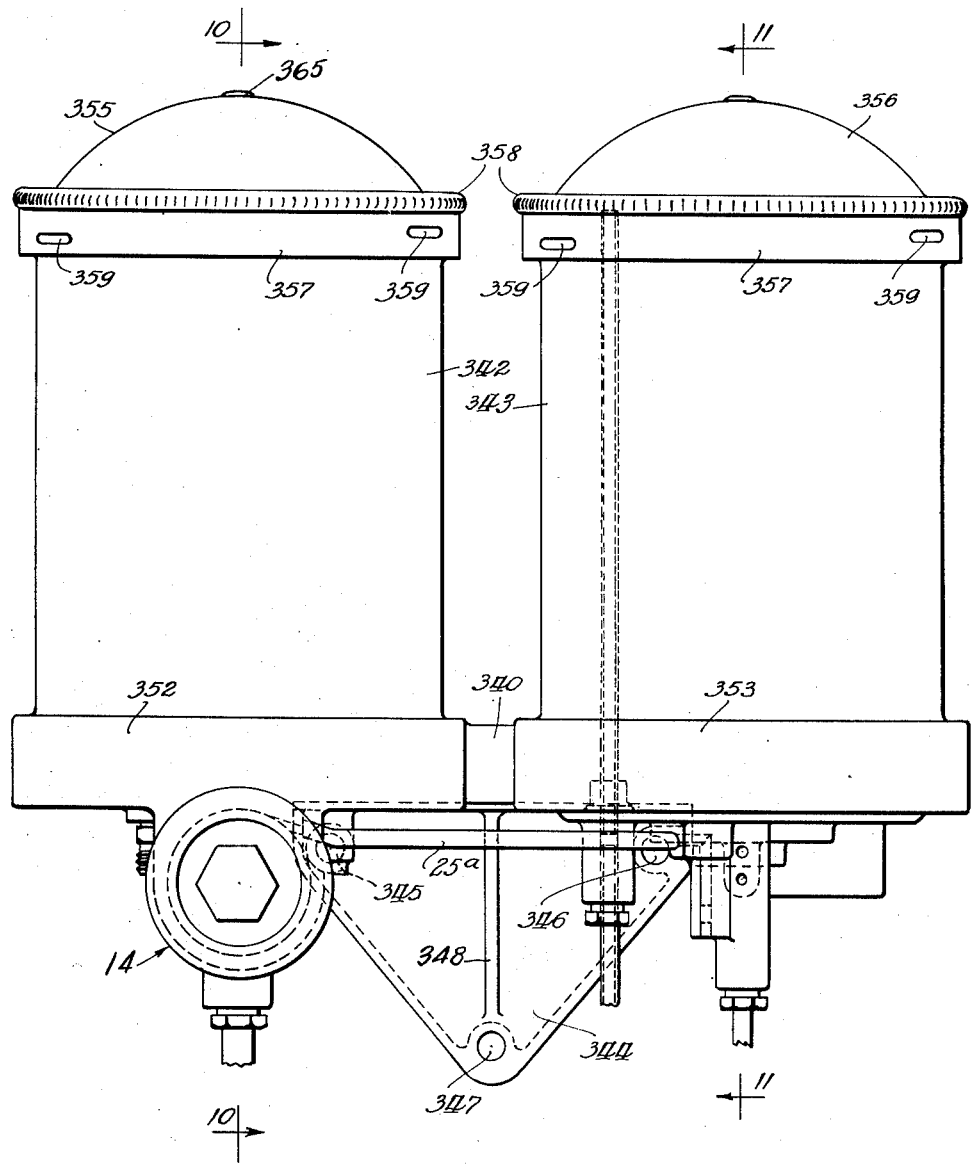

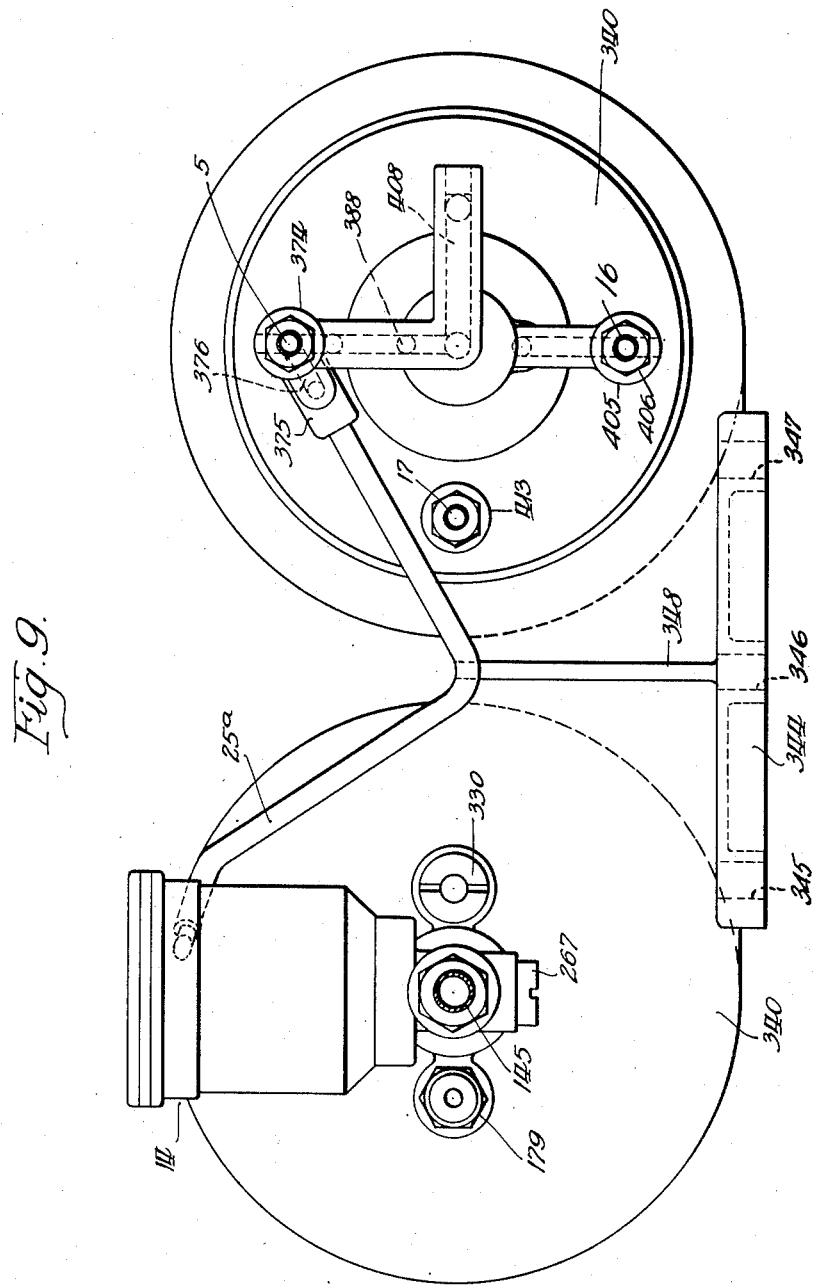

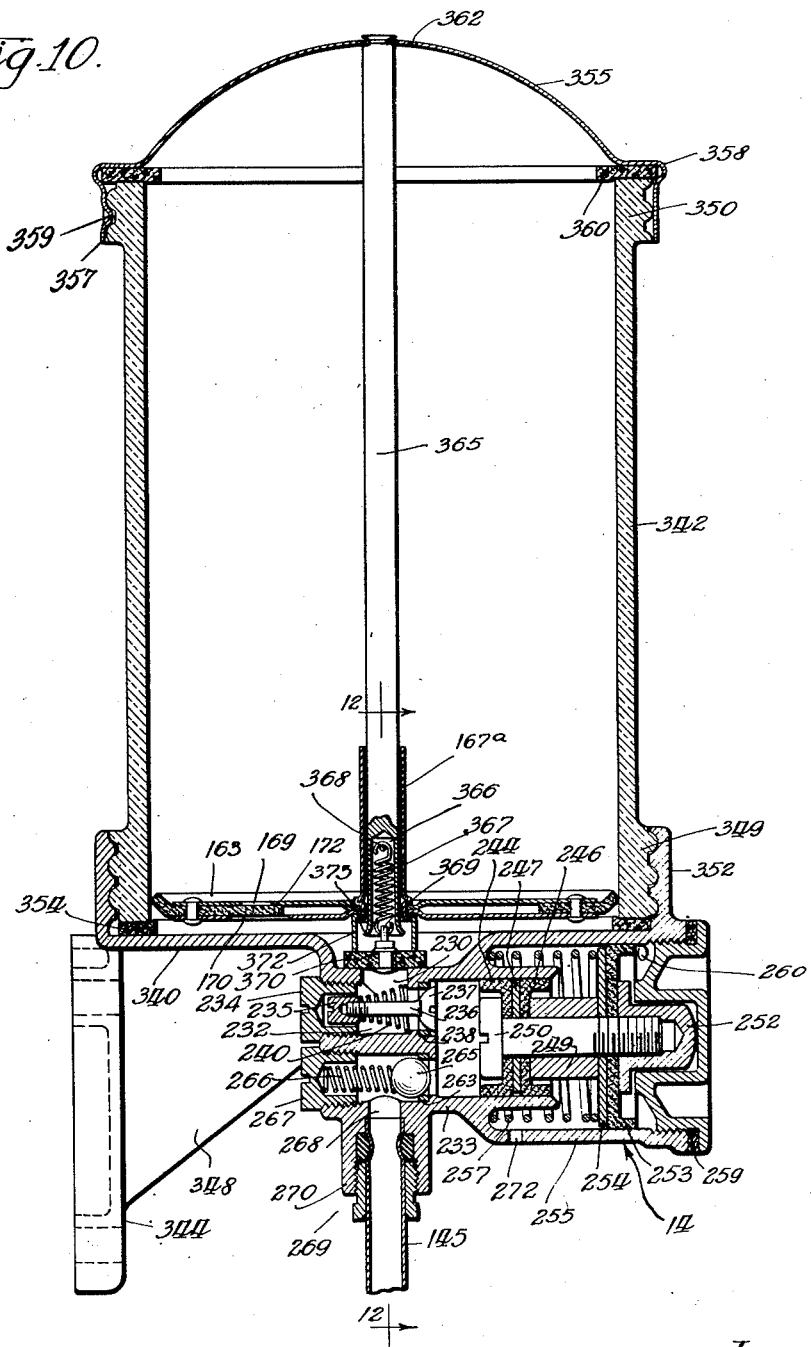

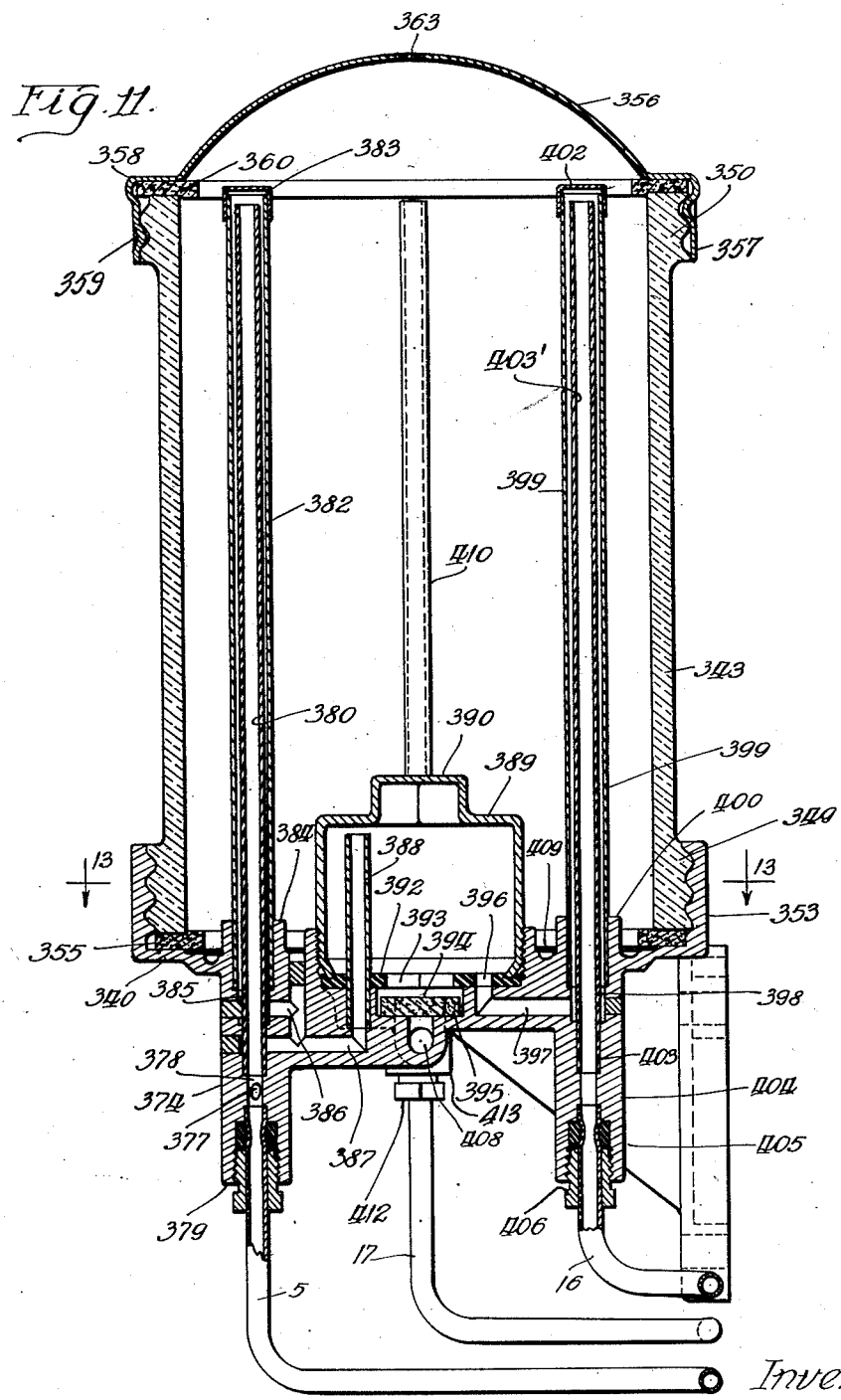

Inventor:
Oscar U. Zerk

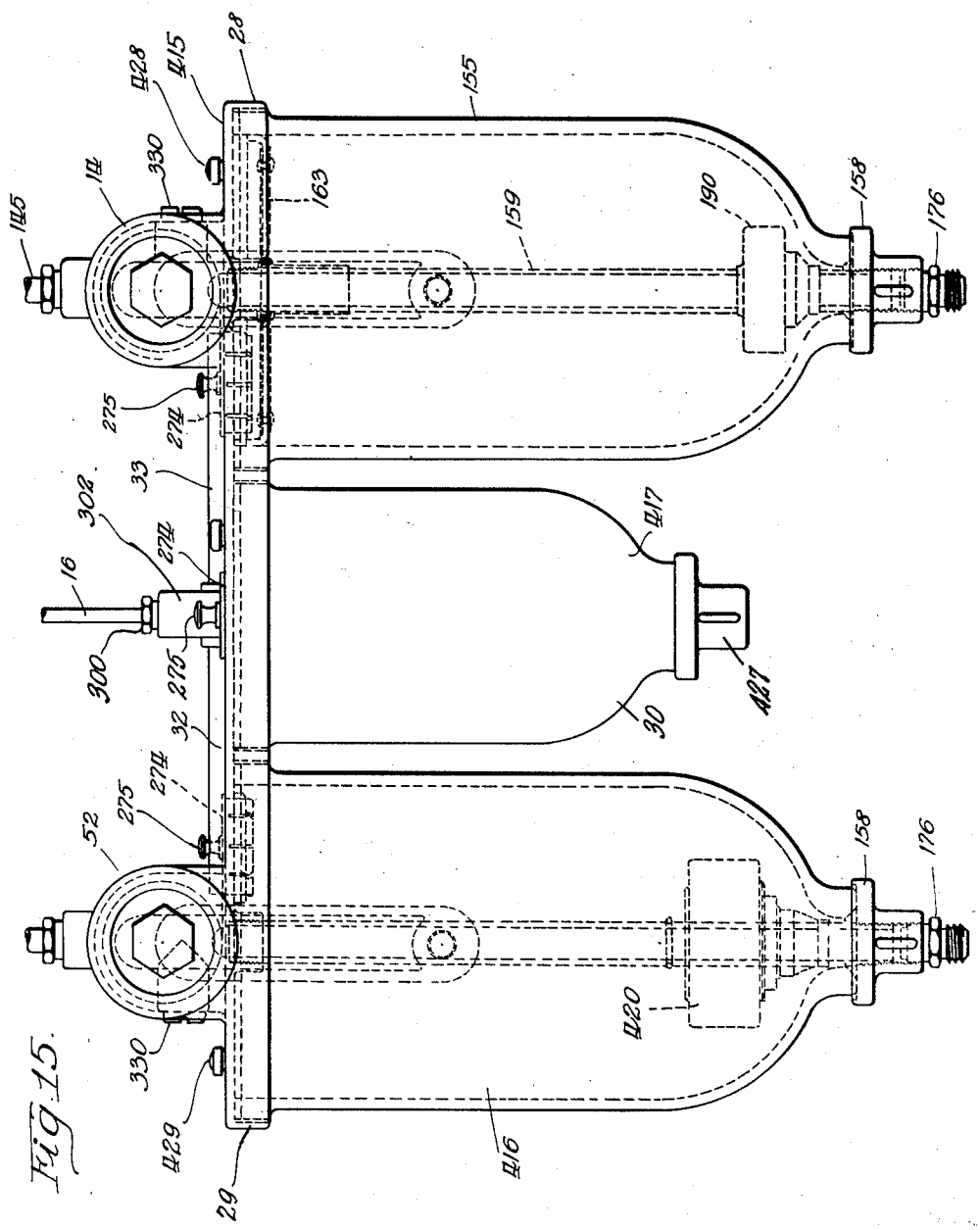

April 17, 1934.     O. U. ZERK     1,955,161
MULTIPLEX SYSTEM OF AUTOMATIC LUBRICATION
Filed Oct. 4, 1929     20 Sheets-Sheet 13
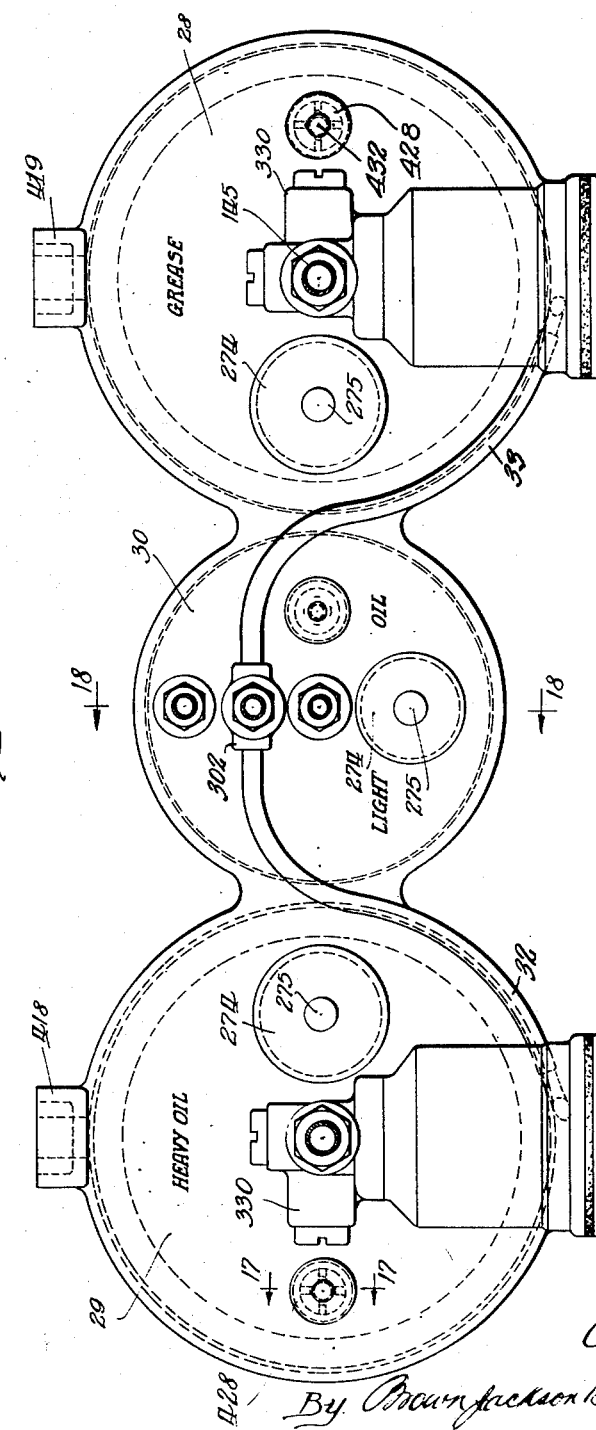
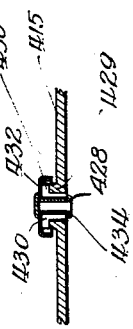
Inventor
Oscar U. Zerk

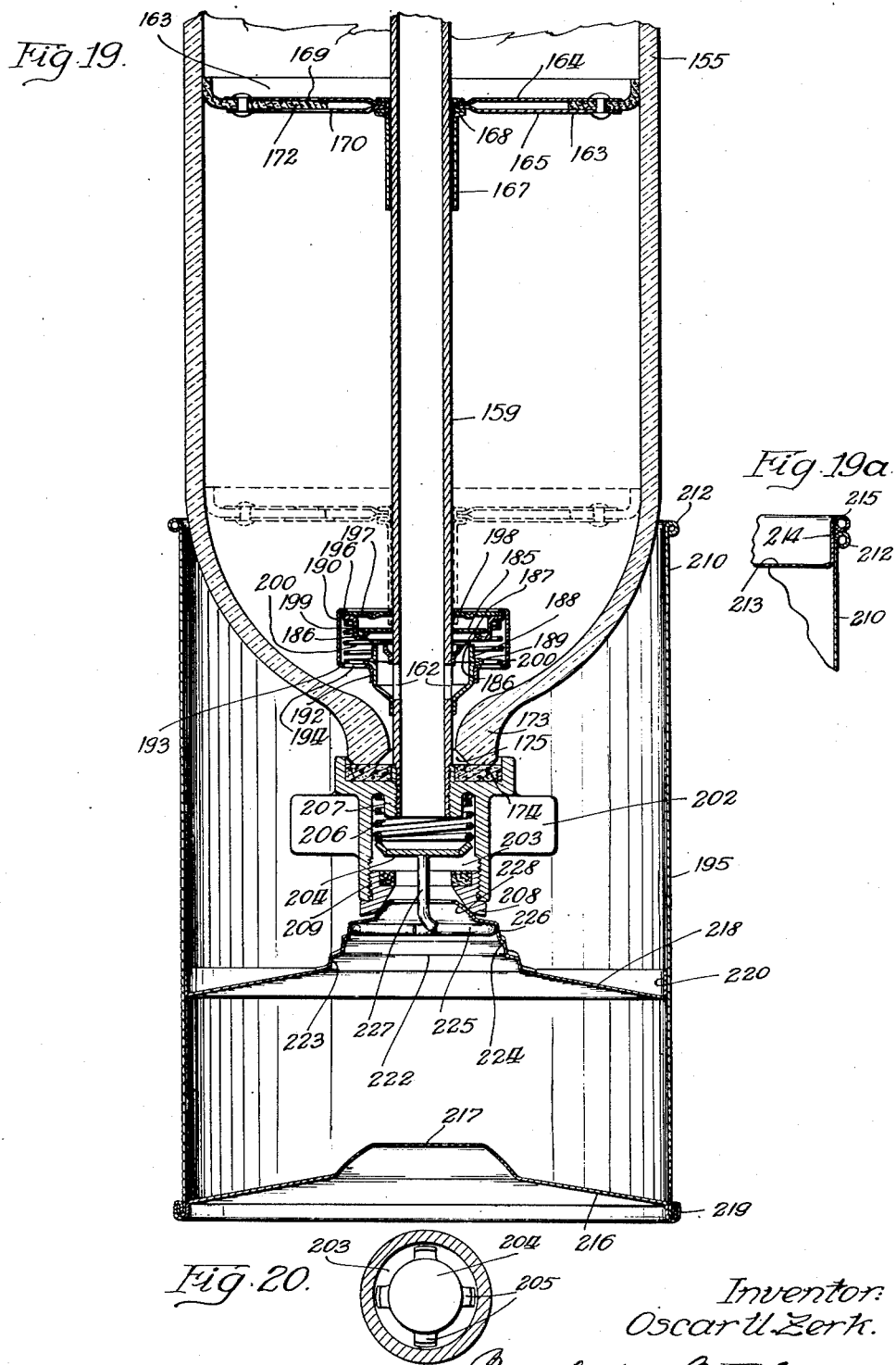

April 17, 1934.   O. U. ZERK   1,955,161
MULTIPLEX SYSTEM OF AUTOMATIC LUBRICATION
Filed Oct. 4, 1929   20 Sheets-Sheet 16
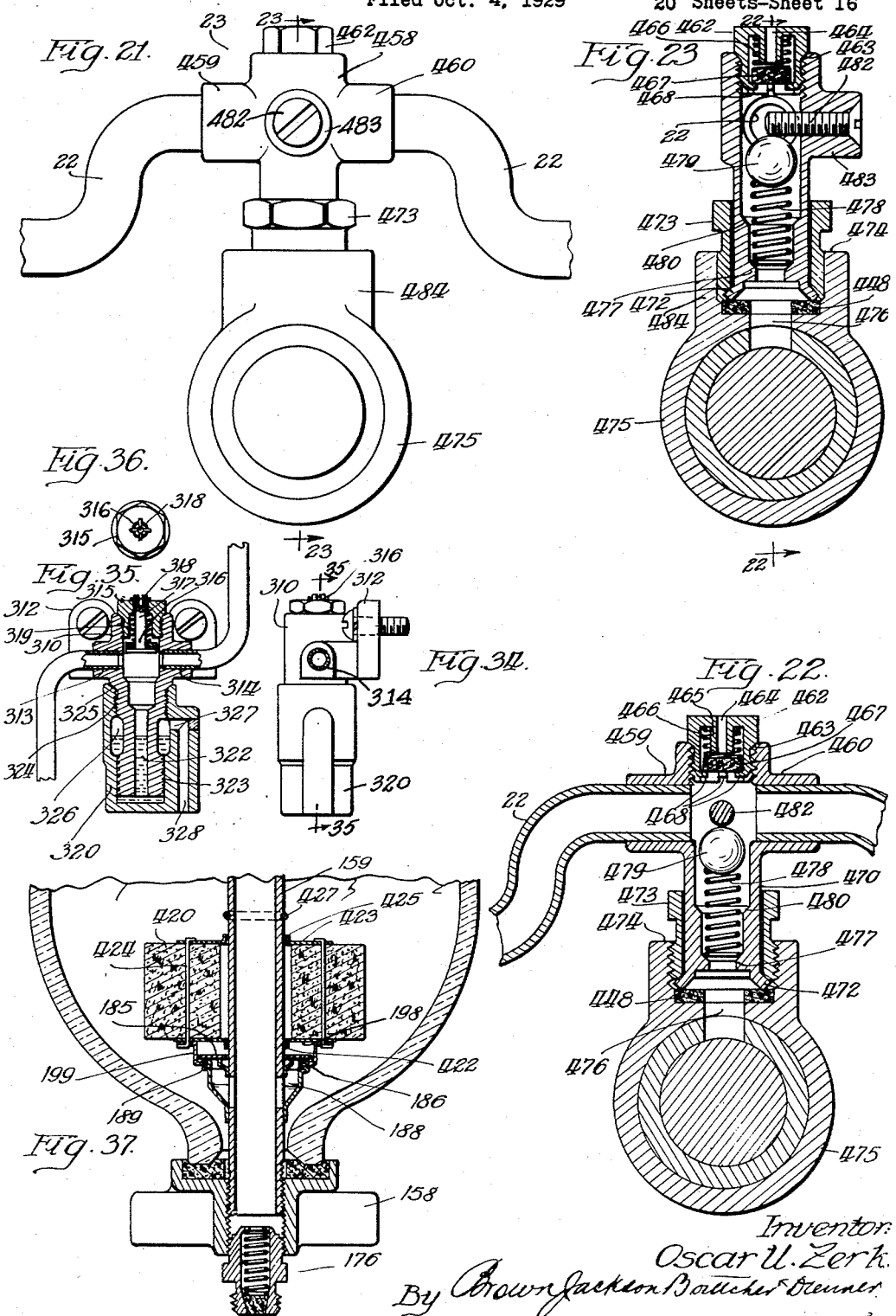

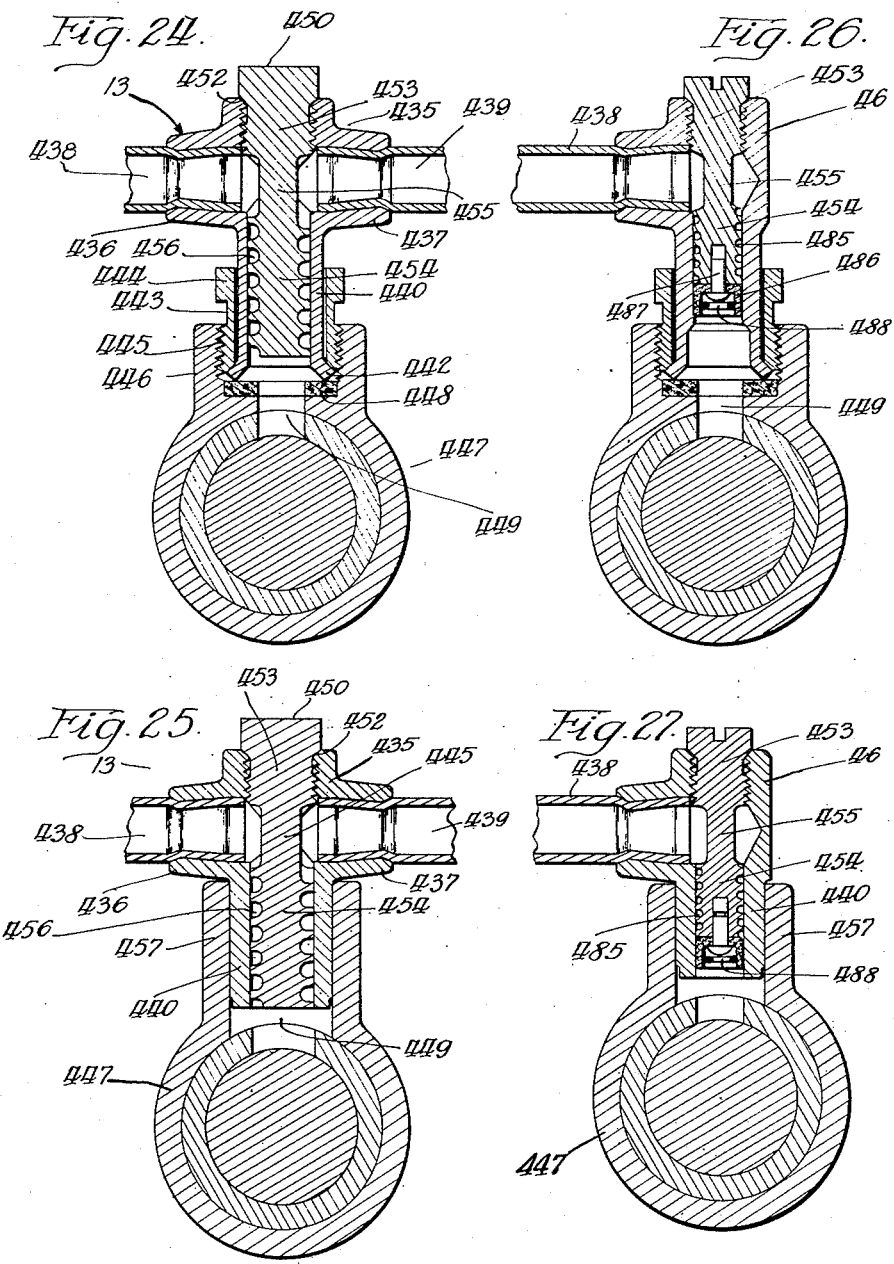

April 17, 1934.  O. U. ZERK  1,955,161
MULTIPLEX SYSTEM OF AUTOMATIC LUBRICATION
Filed Oct. 4, 1929  20 Sheets-Sheet 18

Inventor
Oscar U. Zerk
By Brown Jackson Boettcher & Dienner
Attys

April 17, 1934.   O. U. ZERK   1,955,161
MULTIPLEX SYSTEM OF AUTOMATIC LUBRICATION
Filed Oct. 4, 1929   20 Sheets-Sheet 19
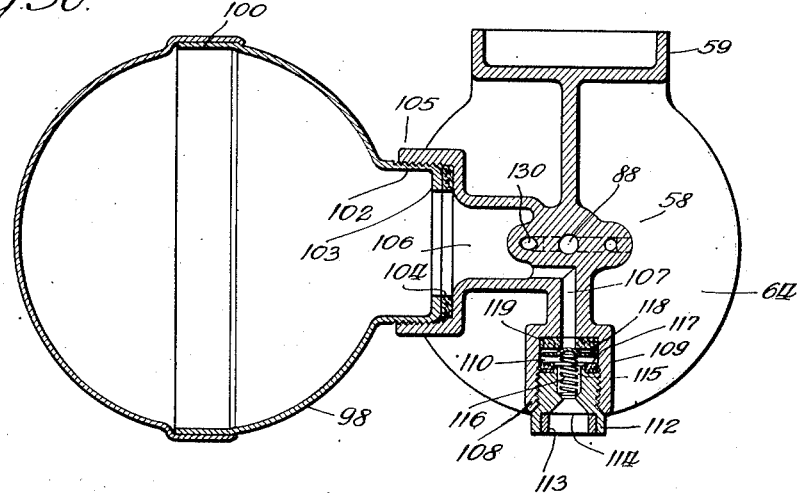
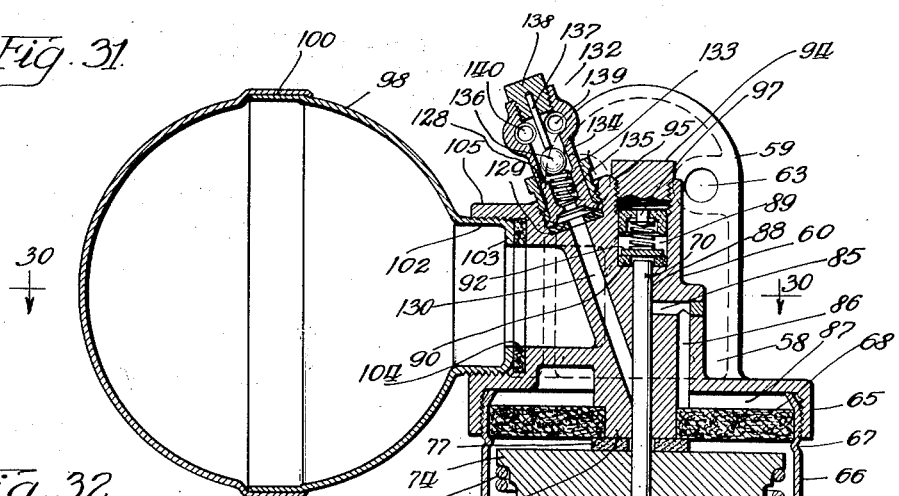
Inventor
Oscar U. Zerk April 17, 1934. O. U. ZERK 1,955,161
MULTIPLEX SYSTEM OF AUTOMATIC LUBRICATION
Filed Oct. 4, 1929 20 Sheets-Sheet 20

Inventor:
Oscar U. Zerk.
By Brown, Jackson, Boettcher
& Dienner
Attys.

Patented Apr. 17, 1934

1,955,161

UNITED STATES PATENT OFFICE 1,955,161

MULTIPLEX SYSTEM OF AUTOMATIC LUBRICATION

Oscar U. Zerk, Chicago, Ill., assignor to Alemite Corporation, Chicago, Ill., a corporation of Delaware Application October 4, 1929, Serial No. 397,337

34 Claims. (Cl. 184—7)

My invention relates to centralized lubrication and is applicable to automotive work, more particularly to the lubrication of the chassis of vehicles, such as automobiles, tractors, gun carriages, war tanks, locomotives, aeroplanes, etc. It is equally applicable to industrial lubrication, that is to the lubrication of stationary machines, such as stamping presses, printing presses, textile machinery, shafting and the numerous types of machines and machine tools of modern industry.

In the lubrication of an automobile chassis it is desirable to use several different lubricants.

As generally practiced heretofore, these lubricants consist of grease which is used for the lubrication of certain bearings, such as the axle bearings that are covered by the hub cap, king bolts, tie rod bolts, steering gear, steering gear connecting rod bolts, shackle bolts and many other bearings of the chassis, and a light or medium grade of lubricating oil for the lubrication of the electric starter and generator, the electric distributor, the fan bearings, etc. In fact, it is not unusual to employ three grades of lubricants, viz. grease for the bearings which have in them or incidental to them cavities adapted for and designed to be packed with grease. Certain other bearings such as shackle bolt, brake mechanism and the like may properly be lubricated with a heavy grade of oil, that is an oil of high viscosity. Other bearings, such as rapidly moving parts, for example, the starter, the generator, the electric distributor, the fan bearing and the like are more properly lubricated with a thin or low viscosity oil.

Present systems of centralized chassis lubrication provide means for distributing only one lubricant. If this lubricant consists of heavy oil, it could obviously not be used on the electric starter, generator, distributor bearings, etc. and if it consists of light oil it could obviously not be used to advantage on cavity bearings such as axle bearings, tie rod bolts, steering gears, steering gear connecting rod bolts, etc.

It is the object of the present invention to provide a system which will give the automobile bearings or the like the lubricant for which they are designed.

Another important object of my invention is to employ a common source of power which will dispense the various lubricants to their respective bearings.

Another object of my invention is to provide a system in which at least one of the dispensing mechanisms involves pressure distribution, preferably for the heavier lubricant, such for example as grease.

Another object of my invention is to provide a pneumatically operated system for dispensing lubricant of different grades or kinds to different groups of bearings.

Another object of my invention is to employ on at least one of the two pneumatically operated dispensing mechanisms a bleeder or exhaust mechanism in order to reduce the air pressure to substantially atmospheric pressure after a lubricating operation.

Another object of the invention is to provide a system for dispensing different grades or kinds of lubricants to different groups of bearings in which the two dispensing mechanisms are simultaneously operated.

Another object is to provide in combination with a machine to be lubricated means to supply the different types of bearings with the different grades or kinds of lubricant for which they are adapted, this means being operated from a central source of power which may be pneumatic, hydraulic, electric or mechanical or otherwise and which means preferably is actuated at periods or intervals which correspond to a definite degree of action, work or motion of the machine to be lubricated.

Another object of my invention is to employ optionally pressure dispensing means for part or all of the dispensing mechanisms for the different grades or kinds of lubricant.

Another object of the invention is to employ a necessary venting operation of one of the systems, such for example as the pneumatic conveying system of my invention as described in the companion application for venting the pneumatic pressure for the entire system, filed September 21, 1929, and bearing Serial No. 394,363.

Further objects of the invention are to provide improvements in the air supply unit, in the reservoir and dispensing unit, and in the pipe-line system, both individually and in combination with each other. Further objects of the invention are to provide improvements in the method of and means for recharging the various reservoirs with a fresh charge of lubricant.

Other improvements and objects of the invention will be apparent from the following detailed description and from the appended claims.

In the drawings, Figure 1 is a top plan view partly in diagram illustrating a duplex system of lubrication embodying my invention;

Figure 2 is a similar top plan view partly in diagram illustrating a triplex system of automatic lubrication;

Figure 3 is a front elevational view of the reservoir and dispensing unit of the duplex system;

Figure 4 is a top plan view of the same;

Figure 5 is a vertical cross-section taken on the line 5—5 of Figure 4;

Figure 6 is a similar vertical cross-section taken on the line 6—6 of Figure 4;

Figure 7 is a front elevational view of a modified form of reservoir and dispensing unit;

Figure 8 is a like view of another modification in which the reservoirs are bottom supported;

Figure 9 is a bottom plan view of the unit shown in Figure 8;

Figure 10 is a vertical cross-section taken on the line 10—10 of Figure 8;

Figure 11 is a similar vertical cross-section taken on the line 11—11 of Figure 8;

Figure 15 is a front elevational view of the reservoir and dispensing unit of the triplex system of my invention;

Figure 16 is a top plan view of the same;

Figure 17 is a fragmentary cross-section taken on the line 17—17 of Figure 16 showing an air vent;

Figure 19 is a vertical section through one of the reservoir units and the filling device therefor;

Figure 19a is a fragmentary detail illustrating the cover for the filling can;

Figure 20 is a transverse section through the filling check valve of the unit shown in Figure 19;

Figure 21 is a side elevational view;

Figure 28:
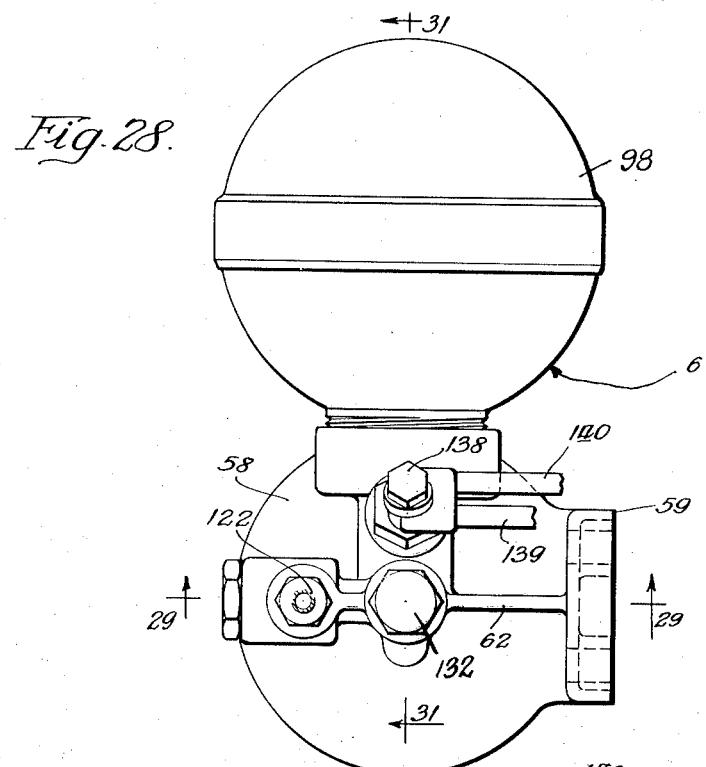
Figure 29:
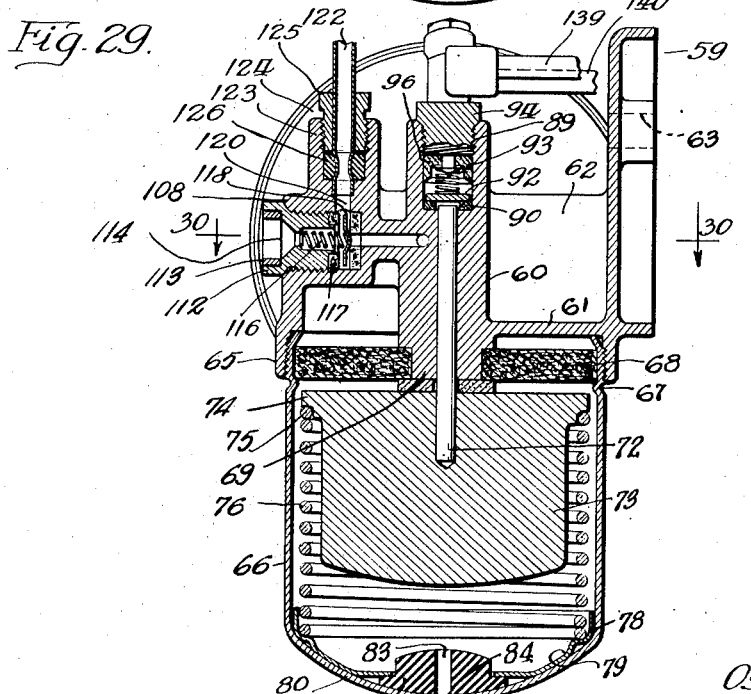
Figure 38:
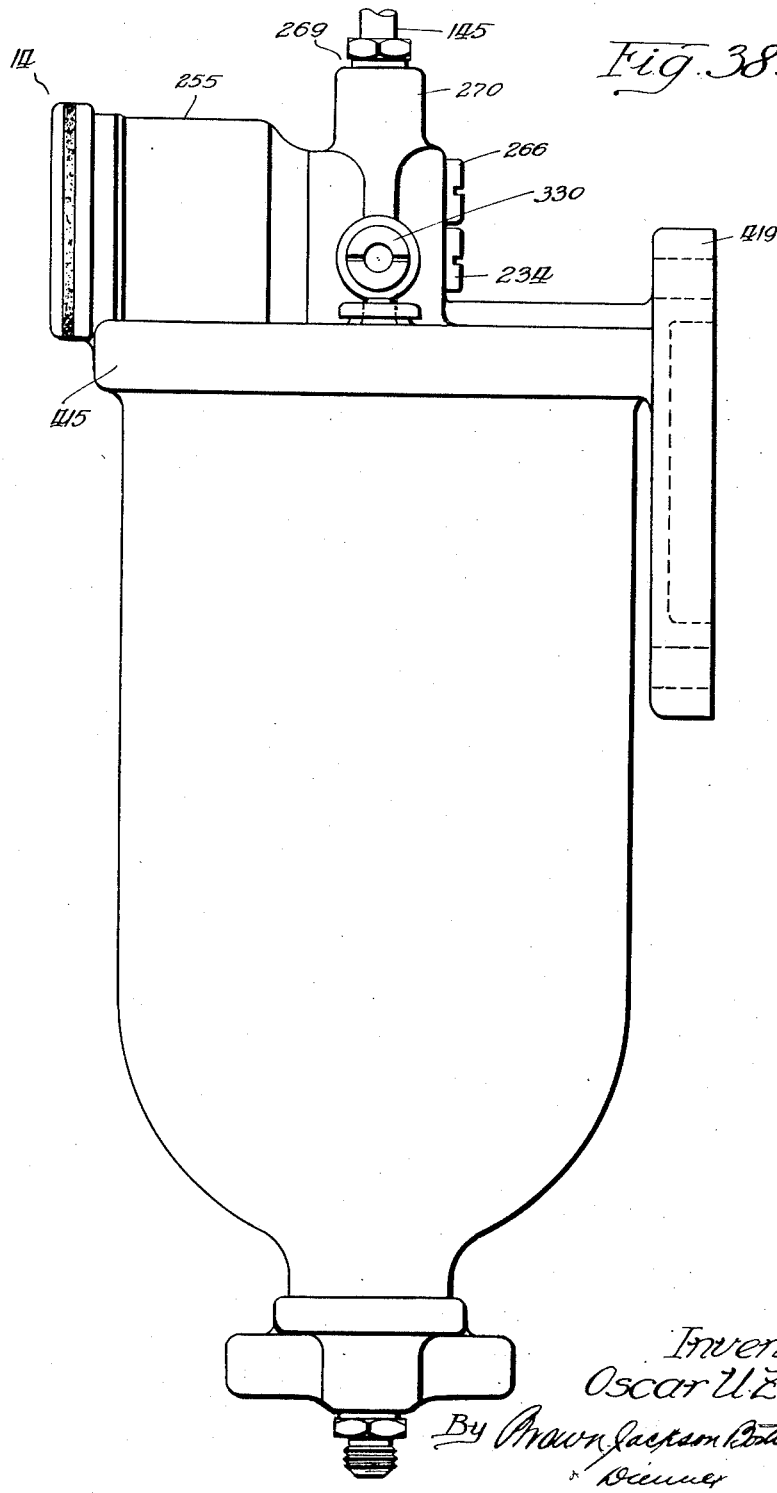

Figure 22 a longitudinal section of a metering unit for light oil;

Figure 23 is a cross-sectional view at right angles to the section of Figure 22 of a metering unit for light oil having a modified form of stem for mounting the same in the bearing;

Figure 24 is a vertical longitudinal section through a metering unit for grease;

Figure 25 is a similar section through a modified form of the same;

Figure 26 is a vertical longitudinal section through a metering unit for dispensing heavy oil;

Figure 27 is a similar sectional view of a modified form of metering unit for heavy oil;

Figure 28 is a top plan view of an air compressor and reservoir unit;

Figure 29 is a vertical section through the same taken on the line 29—29 of Figure 28;

Figure 30 is a horizontal section through the air compressor and reservoir unit taken on the line 30—30 of Figure 29;

Figure 31 is a vertical section of the unit taken on the line 31—31 of Figure 28;

Figure 32 is an elevational view from the left of Figure 31 showing the socket for the attachment of the air reservoir;

Figure 33 is a fragmentary horizontal section taken on the line 33—33 of Figure 32 to show the connection between the discharge check valve chamber and the air reservoir;

Figure 34 is a side elevational view of a compressed air slow-down and quick release valve;

Figure 35 is a vertical longitudinal section through the same taken on the line 35—35 of Figure 34;

Figure 36 is a top plan view of the quick release valve mounting;

Figure 37 is a vertical sectional view through the lower part of an air reservoir showing the low level cut-off valve;

Figure 38 is a side elevational view of the grease reservoir.

Throughout the drawings and description like reference numerals indicate like parts throughout.

*General description*

Referring first to Figure 1 I here show in plan view and partly diagrammatic a duplex system of automatic centralized lubrication embodying my invention. The dash-board or bulk-head 1 of the automobile supports upon the engine side thereof the reservoir and dispensing unit 2 comprising a grease reservoir and dispensing pump device 3 and a light oil reservoir and dispensing device 4. Both devices 3 and 4 are provided with a compressed air supply pipe 5 which leads from a compressed air supply unit 6. The grease supply and dispensing device is connected to a pipe-line system 7, one branch of which leads to bearings such as 8 and 9 and another branch which leads to bearings such as 10 and 12.

The grease is delivered through resistance units such as 13—13 the character of which will be more specifically described hereafter. Their function is to secure equal emission at the bearings where equal emission is desired substantially independently of the distance from the central pump or grease dispensing device 3. The unit 3 comprises a pressure pump 14 which discharges grease under pressure through the resistance units into the bearings.

The device 4 provides a reservoir for relatively light oil which is driven by pneumatic displacement through a pipe-line system 15 comprising a closed loop the outgoing end of which from the device 4 is shown at 16 and the return end of which coming back to the device 4 is shown at 17. At the various bearings such as 18, 19 and 20 which are served by the device 4 and pipe-line system 15, there are the metering units 23, the purpose of which is to trap predetermined quantities of oil for each operation and to feed these by gravity preferably into their associated bearings. The pipe-line system between the metering unit is depressed as indicated at 22—22 to drain the oil from the trap or pocket contained within the metering unit 23 so that only the predetermined amounts or volume of oil contained in such traps or pockets are delivered into the bearings for each lubricating operation.

It is to be observed that the air supply pipe 5 continues on to the grease pump 14 as indicated at 25 so that when a charge of compressed air is delivered to the pipe 5 it serves to operate both devices 3 and 4 substantially simultaneously.

Now it can be seen that by timing the delivery of air to the unit 2 and by proportioning the amount of lubricant discharged at each operation, the bearings of an automobile or like device, even though of totally different character and requiring different kinds of lubrications, can be maintained in properly lubricated condition without waste or deficiency of lubricant.

The air supply unit 6 is preferably automatic in its action so as to deliver a charge of compressed air to the dispensing unit 2 upon the occurrence of a predetermined amount of road travel or other operations of the automobile or other machine. The grease dispensing device will force grease under pressure into the pipe-line system and deliver a small amount of grease, all as predetermined, at the bearings which are to be lubricated with grease and the device 4 will provide predetermined doses of light oil to the corresponding bearings to properly lubricate the same for the corresponding period of operations, such for example as fifty miles of road travel.

In Figure 2 I have shown a unit 27 comprising three devices, viz. the grease reservoir and dispensing device 28, the heavy oil reservoir and dispensing device 29 and the light oil reservoir and dispensing device 30. These are all automatically operated by the delivery of a charge of compressed air thereto from the compressed air plant 6 through the pipe 5, branches of which pipe 5 are indicated at 32 and 33 leading respectively to the heavy oil supply and dispensing device 29 and to the grease supply and dispensing device 28 respectively.

The grease dispensing device 28 is connected to a grease delivery pipe of the pipe-line system 7, one branch thereof leading to the bearings 34 and 35 and another branch leading to the bearings 36 and 37.

It will be observed that these bearings are all shown as having cavities in conjunction therewith. That generally is the case. The grease supply and dispensing units will deliver grease to such bearings as are designed to be lubricated by grease. Such bearings are, for example, wheel hub bearings, king bolt bearings, and certain bearings of the steering gear, tie rod, drag link, etc.

The heavy oil dispensing device 29 is connected to a pipe-line system 38 one branch of which extends to a series of bearings 42, 43, etc., whereas another branch extends to the bearings 44, 45, etc., whereas the units 13 of the grease dispensing system are in the system of Figure 2 the same as those employed in connection with Figure 1. The heavy oil resistance units 46—46 differ from the grease dispensing units in that they embody means such as a check valve to prevent the draining of oil from the system through a bearing or the like by air entering at some other point of the system. The construction of the unit 13 is shown in Figures 24 and 25 whereas the construction of the unit 46 is shown in Figures 26 and 27.

The light oil reservoir and dispensing unit 30 is connected to a pipe-line system for delivering of oil to the bearings such as 48, 49 and 50 through metering units 23 and a pipe-line system 15, the outgoing end of which pipe-line system is indicated at 16 and the return end at 17. Between the metering unit construction 23—23 the depressions or dips 22—22 are formed in the pipe-line system as above explained to drain any oil adhering to the walls of the pipe-line system away from the traps or pockets in the metering unit 23—23 in order to secure accurate measuring of the amount of oil delivered to the bearings for each lubricating operation.

The construction of the unit 23 is illustrated in Figures 21, 22 and 23.

In the lubricating system shown in Figure 2 there are two pressure pumps 14 and 52 for grease and heavy oil respectively and a pneumatic displacement pump to be described more in detail later for the device 30 which supplies light oil.

It is to be understood that I might employ positive displacement pumps throughout for pressure systems for light oil, heavy oil and grease if desired. I prefer, however, the construction shown.

Now with the general character of the system in mind, I shall describe more in detail the main units of the system. These units in each case comprise; first, an air supply unit; second, a reservoir and dispensing unit and third a pipe-line system.

*Air supply unit*

In the diagrams of Figures 1 and 2 I have shown the air supply unit 6 as consisting of three subsidiary devices, viz. the air compressor 55, the air reservoir 56 and the control valve 57. The function of the control valve 57 is periodically or intermittently and preferably, but not necessarily automatically to admit a charge of compressed air from the reservoir to the lubricant dispensing unit, such as 2 in Figure 1 or 27 in Figure 2.

In Figures 28 to 33 inclusive I have illustrated one form of air supply unit, this unit comprises a compressor of the inertia operated type. Instead of compressing the air by vibrational or oscillatory motion of the vehicle chassis through the employment of an inertia weight, I may employ a pump of a shock absorber operated type, such as disclosed in my copending application filed September 21, 1929, and bearing Serial No. 394,363, in which a diaphragm is subjected to the variations of hydraulic pressure in the hydraulic shock absorber to operate the compressor piston. A manual pump to be operated by the hand or foot for supplying compressed air might be employed or air might be taken from any auxiliary source, such as the air brake system of a vehicle.

It is a function of the air compressor and supply plant 6 to apply or provide at intervals charges of compressed air sufficient in amount and pressure to cause operation of the dispensing unit. In the embodiment shown in Figures 28 to 33 inclusive the air is compressed by an inertia type compressor and stored in a reservoir. A pressure controlled release valve subject to the pressure of compressed air in the reservoir controls the application of the compressed air in the reservoir to the dispensing unit. Where an auxiliary supply of compressed air is available, as for example in the air brake system of a car, a manually operable valve for applying a predetermined or sufficient charge of compressed air to the dispensing unit may be employed.

The unit shown in Figures 28 to 33 inclusive comprises a main frame member 58 having a bracket 59 formed integral therewith for mounting the unit upon a part of the automobile or other movable machine part having sufficient motion to secure the desired action of the inertia weight. The frame 58 further comprises a cylinder portion 60 integral therewith, the web 62 joining the cylinder portion with the bracket 59. The bracket 59 is provided with openings such as 63 through which fastening screws may be passed for attaching the frame 58 and thereby the entire unit to the chassis frame of the automobile or the like. The lower part of the frame provides a generally horizontal plate 64 which has a depending internally threaded flange 65 into which there is threaded the upper flanged end of the cup member 66. This cup is made of sheet metal having its upper edge turned inwardly and having a bead at 67 turned inwardly to support the outer margin of a sealing washer of cork or the like 68. The cylinder member 60 extends downwardly having a boss at 69 which is embraced by the filter disk 68. The cylinder 60 has a bore in which lies the plunger 70, said plunger extending out of the boss 69 and being secured at 72 into the upper face of the inertia weight 73 within the sheet metal cup 66. The inertia weight is provided with an outwardly extending flange 74 below which there is a seat for the upper coil 75 of the spring 76.

The surface of the inertia weight 73 is spaced from the spring 76 to avoid engagement to prevent wear, noise and the like.

A cork washer 77 which forms a bumper surrounds the piston or plunger 70 and lies between the lower end of the cylinder and the top face of the inertia weight. The lower end of the spring 76 rests in a seat 78 formed in a sheet metal spring support 79 which conforms in general to the bottom wall of the sheet metal cup 66 but has its bottom wall spaced along the center from the bottom wall of the cup 66 to embrace the flange 80 of the rubber bumper 82. This rubber bumper is apertured as indicated at 83 and the bottom of the cup is also open as indicated at 84 to provide an air inlet connection. The bumper 82 is made of rather soft, tough rubber and it is convex in form and the bottom of the inertia weight 73 is likewise convex in form. The tendency, therefore, for the bumper is to be deformed to a variable degree by engagement with the inertia weight 73 and to assist in accelerating the inertia weight upward this action being further promoted by the coil spring 76 to perform the compression or discharge stroke of the compressor which is formed by the cylinder 60 and the plunger 70. The cylinder 60 provides an overrunning inlet port 85 communicating by way of a passageway 86 to the space 87 above the filter 68. The upper end of the cylinder bore 88 terminates in the discharge check valve chamber 89 which is formed as an enlarged bore or counterbore about the upper end of the cylinder bore.

A yielding valve seat member 90 rests in the bottom of the counterbore and forms a suitable tight seat for the discharge check valve 92 which is preferably a thin disk of metal held to its seat by internal pressure applied by the spring 93.

The upper end of the chamber 89 is closed by a screw plug 94 having a conical shoulder at 95 engaging with the margins of the upper end of the cylinder to form a tight joint. However a cup leather 96 is secured by a pin 97 driven into the bottom surface of the plug 94, this pin 97 engaging the bottom of the cup leather through the intermediary of a small washer and forming at the same time a guide for the spring 93.

This cup leather forms a tight seal for the discharge check valve chamber. The chamber 89 communicates with the air reservoir 98 through a diagonal passageway 99 shown in full lines in Figures 32 and 33. The reservoir 98 is formed preferably of two sheet metal halves beaded and soldered together as indicated at 100. One part of the reservoir has a neck 102 with an inturned flange 103 the outer surface of the flange engaging a cork or other resilient gasket 104 to form an air tight seal.

The outside of the neck 102 is threaded into a threaded socket 105 formed as a part of the frame 58. The threaded socket 105 communicates with a pocket or recess 106 having communication through the inlet pasageway 99 with the discharge check valve chamber 89 and having communication through an L-shaped passageway 107 with the pressure controlled discharge valve 108. This pressure controlled discharge valve 108 comprises a valve housing 109 defining a chamber 110. A plug 112 is threaded into the end of the housing 109. This plug is recessed at its outer end to receive a ring 113 over the inner end of which there is set the screen 114. The inner end of the plug 112 is drilled out or otherwise formed as shown at 115 to form a spring pocket for a suitable compression spring 116, the outer end of the spring seating on a shoulder at the junction of recess in the outer end of the plug and the spring pocket formed in the inner end of the plug.

The inner end of the plug bears a resilient or yielding gasket 117 against the face of which the margin of the valve 118 is adapted to bear when the valve is blown to open position by the internal pressure in the air supply reservoir 98.

The valve 118 has a central projection, this valve preferably being formed of thin sheet metal seating against a yielding valve seat 119 seated in the bottom of the valve housing 109. Normally the area which is presented to the compressed air in the chamber 98 when the valve 118 is closed is an area corresponding only to the central projection. When the valve is blown to open position by internal pressure of reservoir 98, the margin of the valve 118 presses against the yielding seat or gasket 117 thereby exposing a relatively large area to the compressed air so that the spring 116 will not be able to seat the valve again against its valve seat 119 until the pressure drops a degree corresponding to the difference in the areas. This valve is therefore a differential area valve and it secures the blow-down or discharge function through the difference in areas presented by the valve to the action of the compressed air. The back of the valve is always exposed to atmosphere through the connection consisting of the passageway to the plug 112.

The discharge valve chamber 110 communicates by way of a passageway 120 to a delivery pipe 122 which is coupled to a socket 123 formed on the frame 58 through the compression coupling 124. This compression coupling comprises a hollow plug 125 embracing the tube or pipe 122 and bearing against the top surface of a deformable ring 126 through the intermediary of a metal washer or the like, the screw plug 125 bearing against the deformable ring and causing the same to contract upon the pipe adjacent its end.

Preferably the end of the pipe is disposed in a seat or recess below the coupling 124 so that the deformable ring 126 may constrict the pipe back of its end sufficiently to form a shoulder which will prevent displacement of the pipe out of the coupling. The pipe may be constricted in advance of making the coupling so as to secure the desired shoulder effect.

The tube 122 is connected to or corresponds to the pipe 5 of the diagram of Figures 1 and 2.

The frame 58 is provided with a threaded socket 128, the bottom of the socket having a gasket or sealing washer 129 disposed therein and communicating with the lubricating passageway 130. This lubricating passageway terminates at its lower end in the bore 88 of the cylinder so that lubricant discharged into the passageway 130 will come into contact with the plunger 70. I have shown a metering unit 132 of the form disclosed in my copending application filed June 12, 1929, and bearing Serial No. 370,245, as mounted in said threaded socket 128. A threaded sleeve 133 is mounted upon the shank 134 of the metering unit 132 and bears at its lower end against a flange formed on the lower end of the shank 134 pressing the same against the gasket 129 to make a tight seal. The body of the metering unit 132 has a longitudinally extending chamber therein, the lower end of which opens into the lubricating passageway 130.

A spring seat is formed above the outlet and a spring 135 is disposed above the same, this spring 135 supporting a ball 136 normally away from its seat within the body and against the pin 137 which extends from the lower end of the plug 138 that closes the upper end of the body 132. The body 132 has a pair of pipes 139 and 140 connected thereto as shown in Figures 31, 28 and 29. As will be described later, a charge of lubricant propelled by compressed air is driven in through one of the pipes, for example 139, and tends to fill the chamber above the ball check valve 136 which is closed by the pressure of the propelling medium, the excess of lubricant passing out through the other pipe 140. As soon as the pressure is released in the pipe line system, the check valve 136 opens and permits the charge of lubricant to pass by gravity through the passageway 130 into the cylinder bore to lubricate the pump.

The operation of the air supply unit 6 is as follows: The bracket portion 59 is secured to the front end of the chassis frame, that is above the springs, preferably adjacent the front end of the vehicle, as for example, to the front fender bracket and under the fender between it and the front wheels, where the device will receive a relatively large degree of motion due to the irregularities of the road. The inertia weight 73 to which the plunger 70 is attached is supported by the spring 76.

Assume that the device is suddenly moved upwardly by upward motion of the chassis frame, the weight 73 tends to maintain its position by inertia with the result that the spring 76 is compressed. If the plunger 70 drops below the overrunning intake port 85, the cylinder above the plunger and below the discharge check valve 92 will be filled with air at atmospheric pressure. If thereafter the device is held stationary, the recoil of the spring 76 tends to throw the weight 73 and the plunger 70 upwardly. Quite generally where the chassis frame is moved or pitched upwardly, it immediately moves downwardly to seek its position of equilibrium. If this downward motion of the chassis frame and hence of the main frame of the unit coincides with the upward throw of the weight 73 under the recoil of the spring 76, it can be seen that a relatively powerful compression stroke is thereby secured.

Since vibration of a predetermined degree is required to open the overrunning port 85, the response of the air supply unit to motion of the chassis frame is selective. For minor inequalities in the road, effective air compression may selectively be dispensed with.

By suitable proportioning of the weight 73 and the spring 76 a periodicity or inherent frequency of the vibrating system may be determined.

Preferably the frequency of the vibrating system of the air supply unit is so related to the frequency of the spring suspension of the chassis that the natural rate of vibration of the chassis substantially coincides with the natural vibration of the vibratory system of the air supply device.

It is necessary to have a predetermined length of discharge stroke, that is substantially the stroke from the overrunning port 85 to a point where compressed air will be discharged past the check valve 92, in order to secure effective pumping. For this reason the upward throw of the piston and weight is limited by engagement with the cork or like resilient bumper 77 below the boss 69 which forms the end of the cylinder 60.

For the downward throw of the weight 73, the rubber button 82 serves as a limit and bumper tending to assist the recoil of the spring 76.

As air is discharged past the check valve 92 it tends to fill the reservoir 98 and thereby to increase the pressure attained therein.

The reservoir 98, it will be observed, is so disposed that water of condensation and the like may be trapped in the bottom of the reservoir without interfering with the inlet passageway which is disposed relatively high with respect to the bottom of the reservoir and also without interfering with the pressure release valve 108.

In other words, if water of condensation due to compression of moist air is deposited in the reservoir 98, this water will be drained to the bottom of the reservoir and it may freeze there without interfering with the operation of the pump.

While I have shown in this embodiment a metering unit of a centralized lubricating system for lubricating the compressor, it is to be understood that this is not essential to the broad aspect of the air supply unit, as other means of lubrication may be provided, such for example as dry lubrication or lubrication provided in any other preferred manner.

When sufficient pressure has accumulated in the reservoir 98, such pressure acting upon the exposed area of the pressure release valve 92, through the passageway 107, forces said valve against the tension of the spring 116, against the yielding seat 117, closing off the atmospheric vent and discharging the air through the pipe 122 to the dispensing unit which I shall now describe.

*Reservoir and dispensing units*

The above described air supply unit, or any other suitable air supply unit capable of periodically discharging a charge of compressed air through the dispensing unit may be employed in connection with the reservoir and dispensing units, which I shall now describe.

Referring, first, to Figures 3 to 6 which show the form of duplex system illustrated in Figure 1.

The unit shown in Figures 3 to 6 inclusive, comprises the grease dispensing unit 3, having the grease pump 14 and discharge pipe 145 connected to the T 146, which T has its branches joined to branches of the grease delivery pipe 7. A branch from the T 146 leads on one side to the chassis bearings, a longitudinal pipe being disposed on said one side, and likewise the other branch from the T 146 leads to the opposite side of the chassis frame where another longitudinal pipe provides branches to various bearings at said side of the vehicle.

The details of distribution of grease to the various bearings of the car may be more fully understood by reference to my copending application filed September 21, 1929, and bearing Serial No. 394,363.

The light oil dispensing unit 4 has an oil delivery pipe 16 leading to the metering unit 23 for the various bearings lubricated thereby and back to the dispensing unit by way of the connection 17 to discharge the excess oil back into the reservoir. The structure and mode of operation of a light oil supply and dispensing unit of this type is fully disclosed in my copending application filed June 12, 1929, and bearing Serial No. 370,245, to which reference may be had for a complete and full understanding of the details of the same.

These units have a common supporting bracket or frame member 147 which provides a flat top plate with three attaching lugs 148, 149 and 150 by which the unit may be mounted as upon the vertical wall of the bulk head 1 as shown in Figure 1.

The top plate is joined to the lowermost attaching lug 150 through a web 152, which serves to strengthen the same. The top plate provides a pair of circular depending flanges 153 and 154 which form downwardly facing sockets or recesses for receiving the upper ends of the glass bowls or reservoirs 155 and 156. Preferably the upper lip or rim of the reservoir in each case is thickened to reenforce the same and to provide a suitable end bearing to engage a cork or like gasket 157 to form a tight joint. The grease reservoir 155 is held in place by means of a threaded wing nut 158, threaded upon the lower end of the tube or pipe 159, the upper end of which is threaded into a hollow boss or pipe socket 160 depending from the bottom side of the top wall of the frame 147. The tube 159 has a suction opening 162 at the lower end thereof and through this tube the grease pump 14 is adapted to draw lubricant from the supply contained within the glass reservoir 155. A grease follower 163 comprising a pair of plates 164 and 165 gripping between their outer margins a cup leather 166 is secured upon a guiding sleeve 167. The plates 164 and 165 have central apertures, the margins of which are brought together and gripped by beading the guiding sleeve 167 as indicated at 168.

The outer margin of the cup leather 166 fits relatively snugly within the glass reservoir 155, the side walls of the same being substantially a round cylinder down to the bottom which bottom part is rounded to give a pleasing appearance and convenient form for manufacture.

The upper plate 164 of the follower 163 has an opening therethrough at 169 and the lower plate has a larger opening 170 in register with the opening 169. An inwardly extending tongue 172 formed as a part of the cup leather 166, extends over the opening 169 to close the said opening 169 normally, but the tongue 172 is smaller than the opening 170 so that the tongue 172 can be pulled down partly through the opening 170 to provide a direct passageway through the follower 163 in case of difference in pressure, such as suction on the bottom side, which might tend to put too great a load upon the follower and cause buckling of the same. Normally the follower rests upon the grease and the tongue 172 closes the opening 169 so that suction applied to the grease through the suction opening 162 causes the flow of the grease up through the pipe 159 to the grease pump 14, as will be described presently. However, as soon as the supply of grease is substantially depleted and the follower 163 arrives in the vicinity of the rounded bottom part, it can be seen that if the follower is tight and too great suction is applied, the large area which the follower presents might result in damage to the same due to the suction.

The release valve which I have just described prevents such damage to the follower or to any part of the mechanism, while normally keeping the follower on top of the body of grease so as to prevent the formation of an air passage through the grease due to the suction.

The lower end of the reservoir 155 is provided with a hollow boss 173 through which the lower end of the pipe 159 projects. The wing nut 158 has a recess containing a gasket 174 adapted to engage the end of the hollow boss 173 so as to form a tight joint. It will be observed that the inner periphery of the hollow boss is chamfered off as indicated at 175 so that the cork or the like gasket 174 which engages the end face of the hollow boss 173 is forced radially inwardly by the endwise pressure of the wing nut 158 to form a tight seal, not only on the end of the boss 173, but also about the cylindrical portion of the pipe 159.

A filling nipple 176 is threaded in the lower end of the wing nut 158, this nipple comprising a rear threaded portion 177, an intermediate hexagon portion 178 and a lower threaded portion 179 which is adapted to be engaged by a threaded coupling member through which grease under pressure may be forced through the filling nipple 176 to refill the reservoir. The inner end of the nipple 176 is beaded over as shown at 180 to provide a stop or shoulder for the compression spring 182, the lower end of which bears against a tapered conical valve 183 seating in the outer end of the nipple and serving as a check valve.

The spring 182 is of sufficient strength to hold the check valve 183 closed against the suction of the grease pump.

As I shall describe in connection with Figure 19, a modified form of filling connection may be provided by which grease may be taken directly from a can and discharged into the reservoir 155 without intermediate connection.

The sleeve 167 forms in connection with passageway or opening 162 a low level valve for shutting off further withdrawal of grease from the reservoir 155 when the supply therein is substantially depleted. A stop in the form of a spring ring 184 set in a groove in the lower part of the pipe 159 below the opening 162 limits the downward motion of the follower and the guiding sleeve 167. This is for the purpose of retaining the follower upon the pipe 159 if the reservoir is removed as for filling the same by hand. In operation the sleeve 167 guides the follower 163 as the grease is withdrawn and if too much grease should be withdrawn the sleeve 167 passes over the opening 162 closing off the same and preventing the drawing of air through the grease pump 14.

Referring now to Figure 19, the construction of the low level valve and of the filling nipple may be modified as shown. In this construction instead of having the sleeve 167 overrun the suction inlet port 162, I provide instead a lift valve which may make a better closure.

The lift valve 185 is preferably a piece of empire cloth, although it may be metal. Preferably it is of sufficiently yielding character to form in connection with the double bead valve seat a tight joint. The double bead valve seat 186 is formed of two sheet metal stampings or spinnings, the inner one of which is a ring 187 necked down at its inner end to embrace the tube 159 above the opening 162. The outer seat is formed likewise by a ring or sleeve 188, the lower end of which likewise is necked down to embrace the tube 159 below the opening 162. The two rings 185 and 188 have their upper ends lying in the same plane at right angles to the axis of the tube 159 or substantially so. The outer ring or sleeve 188 is beaded at 189 and a housing member 190 of generally cylindrical form has a flange 192 formed on its bottom wall 193 and this flange 192 embraces the sleeve 188 below the bead 189. The sleeves or rings 185 and 188 are soldered to the tube 159 and the flange 192 may likewise be soldered to the ring 188 below the bead 189. The bottom wall 193 of the housing 190 has passageways or openings 194 therethrough for the passage of grease through the same inwardly under the suction of the grease pump or outwardly when the reservoir 155 is filled with grease from the can or package 195.

The upper margin of the housing 190 is flanged over as indicated at 196. Instead of a flange fingers may be struck over at a number of points to accomplish the same purpose.

Within the housing 190 a cage 197 supports the disk valve 185.

The cage 197 comprises a top plate 198 which embraces rather closely the tube 159 and has its outer margin normally resting under the flange 196 of the housing 190. It is provided with a series of depressions so as to keep the disk valve 185 from sticking flat against the same. The other part of the cage 197 comprises a ring 199 having an outwardly extending flange at its upper end joined to the margin of the top plate 197 as by soldering or the like, and having at its lower end an inwardly extending flange on which the valve disk 185 rests. Preferably this lower flange which supports the valve disk 185 has one portion raised slightly higher than other portions so as to lift the disk valve 185 in effect at one point before it is pulled off the rest of the valve seat.

The cage 197 and its contained valve disk 185 is normally held in raised position against the housing flange 196 by means of a spring 200. When, however, the follower 163 descends due to substantial depletion of the charge of lubricant in the reservoir 155, the sleeve 167 engages the top of the cage 197 and presses the same downwardly against the spring 200 and causing the disk 185 to be permitted to rest upon the double bead valve seat 186 thereby effectively closing off communication between the pump and the interior of the reservoir 155.

The same form of low level valve may be employed in connection with heavy oil except that instead of the follower 163 a float is connected to the valve cage 197 so that when the supply of oil is substantially depleted the float pushes the cage 197 and applies the valve disk 185 to its seat cutting off further withdrawal of oil.

As shown in Figure 19 I have provided a novel form of filling connection and supply package or can for filling the grease reservoir 155. The wing nut 202 which corresponds to the wing nut 158 of Figures 5 and 6 has the gasket 174 bearing against the hollow boss 173 of the reservoir 175 and has a threaded portion threaded upon the lower end of the tube 159 as previously explained. The lower end of the threaded nut 202 has a relatively large body portion forming a valve housing 203 containing an inlet check valve 204 comprising a disk as shown in Figure 20 with a series of bent up arms 205 which are guided in the housing 203 and which arms are adapted to be engaged by a compression spring 206 the upper end of which is set in a recess surrounding the upper threaded portion 207.

The lower end of the housing 203 is closed by a ring 208 having a conical inlet opening terminating in a shoulder in which there is disposed the annular valve seat 209 formed of cork or like yielding material and adapted to be engaged by the central disk portion of the inlet check valve 204.

The spring 206 which applies the check valve 204 to its seat 209 is made relatively strong for two reasons; first, in order to hold the valve against its seat under the suction which the grease pump may exert in the tube 159 when the disk valve 185 has closed the double bead valve port 186. Also, it is desirable to have the valve 204 firmly seated on its seat to prevent the escape of oil which seeps out of the grease.

The lower end of the opening in the hollow plug 208 is rounded outwardly below the central conical portion both to make it easy to clean the surface of the same and also to secure a tight joint with the supply can or package when the grease is to be discharged into the reservoir 155. A cylindrical cap, not shown, is pressed upon the outer cylindrical surface of the plug 208 closing the lower end of the same.

The package of grease from which the reservoir 155 is filled is preferably supplied in the shape of a can having a cylindrical wall 210 terminating at its upper end in a bead 212 turned outwardly as shown in Figures 19 and 19a. The can is closed by means of a cover 213 illustrated in fragmentary form in Figure 19a, this cover comprising a central portion which may be shaped in any desired manner and having a cylindrical flanged portion 214 adapted to fit within the cylindrical mouth of the can. The cover member 213 has the outwardly turned bead 215 which is adapted to rest upon the bead 212.

Hence to open the can it is necessary only to force a thin instrument such as a screw driver or the like between the beads 212 and 215 whereupon the cover 213 may be removed.

The lower end of the can is provided with a bottom 216 which is arched or coned upwardly in two distinct portions, one part the outer portion being formed as a relatively flat cone, whereas the central part as indicated at 217 is formed as a relatively deep boss somewhat convex in section to fit within the corresponding recess formed in the follower or plunger 218. The bottom 216 and the side walls 210 are joined by a suitable bead or tinners joint 219.

The follower or piston 218 is provided with a flange 220 at its outer periphery which flange is cylindrical and fits relatively closely the walls of the can and acts as a guide. The flange 220 may be turned upwardly as shown in order to permit the main conical wall of the follower 218 to fit the bottom wall 216, as shown. These parts, viz. the follower and the bottom may be varied in construction, it being desirable however to have the follower or piston 218 come as close as possible to the bottom wall 216 to minimize the clearance and hence the waste of grease which is trapped between these parts when the follower is forced to its bottom position.

It is observed that the diameter of the can is such that it may telescope freely with the reservoir 155. It is not intended that the can be guided on the walls of the reservoir, preferably a slight clearance being provided to keep the same out of contact but so long as the can is approximately the size of the reservoir 155, the tendency on the part of the operator will be to put these parts substantially in alignment so as to avoid binding of the can with respect to the reservoir.

The follower or piston 218 is provided with a central discharge nozzle 222 which is preferably formed in a series of steps, such as 223 and 224 for the purpose of centering with respect to the follower 218 grease guns or the like of different diameters.

A circular wire member 225 lies in an annular step or recess 226 within said nozzle 222, the annular portion of the wire seating therein and being soldered to the nozzle. This wire member has a central pin formed as an integral part of the wire extending axially up through the open end of the nozzle as shown at 227. This pin extends sufficiently far above the final step 228 of the nozzle to permit the valve 204 to be lifted from its seat 209 when said last step 228 of the nozzle is applied to the inlet ring 208 of the reservoir.

The last step 208 is formed as a convex conical spout or hollow stud with a central opening surrounding the pin 227. The function of the spout 228 is to make a sufficiently tight contact connection with the inlet ring 208 to permit of the discharge of grease under the required pressure without appreciable leakage. The rounded approach of the inlet ring 208 and the rounded convex character of the spout 228 permit of such a tight contact connection being made by merely applying the spout 228 to said inlet ring and pushing upon the bottom of the package even though the parts are not accurately in alignment.

The volume of grease in the package 195 is just enough for one filling of the reservoir 155. The intention is that the reservoir 155 should be filled before withdrawal of grease therefrom is completely shut off and hence the capacity of the reservoir is sufficiently in excess of the capacity of the package 195 that the entire contents of the package may be discharged into the reservoir for filling the same. It is undesirable that an open can of grease be permitted to stand around a garage or the like where dust and dirt can get into the grease and my invention contemplates therefore the preparation of a package which will constitute one complete refilling charge for the reservoir, it being intended that the can should then be thrown away.

The shape of the admission ring 208 forming one half of the contact coupling is such that it may readily be wiped clean of dust or dirt.

Therefore, to fill the reservoir the operator takes the lid 213 off of the can 210, the piston or follower 218 being then at the top or in its uppermost position. The operator then thrusts the pin 227 up through the intake opening to unseat the inlet check valve 204 and then forces the can upwardly causing the displacement of the contents between the piston or follower 218 and the bottom of the can into the reservoir 155 through the lower end of the tube 159, openings 162, through the annular valve port formed between the double bead seat, lifting if necessary the valve disk 185 and then discharging through the housing 190 by way of the openings 194 in the bottom half into the reservoir 175. The follower 163 is forced upwardly by such introduction of grease until the filling operation is completed.

The same package of grease 195 may be employed for filling the barrel of a grease gun or the like, the same being placed with its open end upon one of the shoulders of the follower 218 and pressed downwardly to discharge the contents of the can into the grease gun barrel or the like.

The withdrawal tube 159 communicates at its upper end with a passageway 230, the upper end of which merges into an inlet check valve housing 232, formed as a cross passage in the frame member 233 of the pump unit 14.

The outer end of said cross-bore is closed by a screw plug 234, this plug being recessed on its inner side in order to form a guide for a nut 235 which is threaded upon the stem 236 of the inlet check valve 237. The valve proper consists of a rounded head formed on the right hand end of the stem 236, this valve 237 being adapted to seat against a yielding annular seat 238 set in a recess formed at the end of the port 239. An inlet check valve spring 240 normally holds the valve 237 against its seat, the stem and head serving to guide the same properly. The inlet check valve 237 opens into the pumping cylinder 242 which cylinder is formed integrally with the frame or casting 233. A piston 244 comprising two cup leathers 245 and 246 facing in opposite directions moves in the bore of the cylinder 242 to make the suction and discharge strokes. The cup leathers 245 and 246 are separated by plate 247 and the bottoms of the cups are held together through the medium of a bolt 248, the head 250 of which bears against the bottom of the cup leather 245. A sleeve or collar 249 embraces the shank of the bolt 248 and bears against the bottom of the cup leather 246. The plunger or piston 244 is thereby rendered tight for pressure difference in either direction.

The outer end of the bolt 248 is threaded into a cap nut 252 which has a flange engaging the bottom portion of a cup leather 253, the opposite side of the cup leather having a follower plate 254 resting against the collar 249.

A motor cylinder 255 is formed integral with the pumping cylinder 242 and a pocket or recess 256 between the cylinders receives the compression spring 257 which bears against the follower plate 254 and tends to force both the motor piston and its connected pump piston to the right. The outer end of the motor cylinder is threaded and flanged to receive the threaded and flanged head member 258 which closes the end of the motor cylinder 255. A gasket 259 is gripped between the flanges and forms a fluid-tight joint. The clearance space between the head and the motor piston communicates by way of a port 260 with a branch air pipe 25 leading to the air supply pipe 5.

The head member 258 has a central hollow boss for receiving the cap nut 252 this boss forming also a suitable means for the attachment of a wrench for turning the head on the thread.

The pumping cylinder 242 has a discharge port 262, a yielding seat 263 being set in an annular shoulder at the junction of said port with a discharge check valve housing 264, a ball check valve 265 cooperating with said seat 263 to form a discharge check valve. The ball 265 is pushed toward the seat by the compression spring 266, the rear end of which rests in a pocket formed in the screw 267 which closes the transverse bore forming the discharge check valve housing 264.

The said housing 264 communicates by way of a port or passageway 268 with a discharge pipe 145, this pipe being secured by compression coupling 269 in a threaded socket 270 formed as a part of the main frame 233.

The operation of the grease pump 14 will be obvious from the above. When a charge of compressed air from the unit 6 is delivered through the port 260 which opens through the side walls of the motor cylinder 255, the motor piston with its connected pump piston is driven toward the left as shown in Figure 6. The contents of the cylinder 242 are driven past the discharge check valve 265 which opens under pressure to permit the escape of the contents of the cylinder into the discharge pipe 145. As soon as pressure is exhausted in the motor cylinder, the spring 257 moves the connected pistons to the right as viewed in Figure 6, creating suction in the cylinder 242 causing the drawing of grease by suction through the opening or openings 162 in the pipe 159 past the inlet check valve 237 into the cylinder. The depletion of pressure in the motor cylinder is caused by the escape of compressed air through the light oil lubricating system, as will be described presently, although it is to be understood that where two such motor operated pumps are employed for distributing grease and heavy oil, for example, separate exhaust means is provided. If a motor piston pump or pumps are employed, either in conjunction with the light oil lubricating system, or independently of the same, quick release valves may be employed to release the pressure from the motor piston or pistons either in conjunction with or without a suitable bleeder for permitting the escape of compressed air.

The space between the motor piston and the pump piston is open to atmosphere through a port 272 formed to the side walls of the motor cylinder 255.

The oil dispensing unit is shown in section in Figure 5. This device comprises the glass reservoir 156 which is substantially identical with the glass reservoir 155. The glass reservoir 156 is held in place by a wing nut 158 which is in all respects identical with the wing nut 158 on the reservoir 155. Obviously, if desired, the wing nut 202 shown in Figure 19 with a corresponding form of inlet valve might be provided, but for a light oil which pours readily it is simpler to introduce the light oil at the top plate 147 through either one or the other of the removable covers 274—274 which are provided with knobs or handles 275 by which they may readily be removed from the openings in the cover or plate 147. These removable plugs are preferably made of sheet metal with depending cylindrical flanges beaded at the lower edge and slotted as indicated by dotted lines at 276 in Figure 3.

The wing nut 158 shown in Figure 5 is threaded upon a stud 277, the stud being drilled axially and radially as indicated at 278—279 to provide a communication between the filling nipple 176 and the interior of the reservoir 156. Obviously instead of pouring the oil into the openings covered by the snap covers 274, the oil might be introduced through the check valved inlet filling nipple 176 which is like that shown in Figure 6 for the grease dispensing device.

The upper end of the stud 277 is connected to a cup shaped fitting 280 comprising a cylindrical portion 282 which is threaded interiorly to receive the lower threaded end of the chamber member 283. The chamber member 283 is formed of a sheet metal stamping of generally cylindrical form having a dome shaped top as indicated at 284, surmounted by a threaded flange 285. At its lower end the chamber member 283 has the margin turned inwardly at 286 to engage a gasket member 287 which gasket member rests in an annular shoulder formed at the bottom of the cup shaped member 280. Below the shoulder 288 the central part of the cup is depressed to form a valve chamber 289 for the inlet check valve 290. The inlet check valve 290 is a thin flat disk provided with extending arms or ears by which the same is guided in the housing 289 and prevented from escaping through the opening in the gasket member 287. The upper end of the stud 277 extends through a central opening in the bottom wall of the cup 280, said stud having a head member 292 flanged over the margins of the bottom of the cup. A radial and axial drilling forms an L-shaped inlet passageway 293 from a reservoir 156 to the interior of the chamber 283 for the admission of oil by gravity. The outside of the annular shoulder member 288 is gripped by a flange 294 of a screen member 295 which screen member is formed of downwardly convex formation having a cylindrical flange 296 embracing the shank of the stud 277 below the inlet opening of the passageway 293.

The upper end of the passageway 293 terminates in the inlet check valve port closed by the inlet check valve 290.

The chamber member 283 is connected to a pipe 296' which is threaded into the threaded neck 285 on the upper end of the chamber member 283. At its upper end the pipe 296' is threaded into a threaded boss 297, depending from the bottom wall of the main frame plate 147. The hollow or threaded boss 297 has a recess above the end of the pipe 296' communicating by way of a diagonal passageway 298 with passageway 299, one branch of which communicates with the air pipe 25, leading to the grease dispensing pump 14 and the other branch of which communicates with the air supply pipe 5 which supply pipe is connected to a compression coupling 300 in a threaded socket 302 formed integral with the frame member 147.

A discharge pipe 303 has its upper end seated in a central bore 304 formed in the body of the main frame or plate 147 in line with the threaded boss or socket 305 to which the discharge pipe 16 of the pipe line system is connected through a suitable compression coupling 306. The lower end of the discharge pipe 303 extends down inside the chamber 283 to the bottom thereof and terminating only a short distance above the inlet check valve 290.

From the above construction it can be seen that if the reservoir 156 contains a body of oil filling the same, for example, half way to the top, the gravity head or superfluous pressure of the oil will lift the inlet check valve 290 from its seat and permit oil to pass through the screen 295 to the passageway 293 past the check valve 290 into the chamber 283 and up the pipe 296 to seek its own level. The valve 290 will then tend to close by gravity. When a charge of compressed air is admitted by way of the pipe 5, the oil contained in the space between the pipes 303 and 296' is driven downwardly through the chamber 283 and this oil and the contents of the chamber 283 are driven up through the discharge pipe 303 and out through the pipe 16 to the metering unit, such as 23, connected to the pipe line system 15 heretofore described.

The return pipe 17 of the pipe line system 15 brings the surplus oil back through passageway 307 into the reservoir 156. The pipe 17 is connected to the boss 308 which has a threaded socket by means of a compression coupling 309. The air which is thus discharged into the top of the reservoir is permitted to escape to atmosphere by way of a vent 428 which provides ample openings to atmosphere particularly in an outward direction.

Any other suitable atmospheric vent connection which is desired may be provided. Since the pipe 5 which is connected to the air supply reservoir through the automatic pressure release valve 118 is connected through an open connection to both the grease dispensing pump 14 and to the displacement chamber 283 it will be seen that the tendency will be to operate both of these units at the same time. Since less time will be required to operate the grease pump because of the differential in area of the motor with respect to the pumping piston and the relatively slow travel of the oil from the displacement and measuring chamber 283 out through the pipe line system 15 and past the respective units, the grease pump motor piston and pumping piston will be driven to make the discharge stroke and will stand in that position while the air is expanding through the pipe line system 15 to distribute the lubricating oil to the various bearings and as soon as the air has driven the surplus oil back through the return passageway 307, the air is then free to escape through said passageway 307 to atmosphere, thereby relieving the motor cylinder of the pump 14 of compressed air and permitting the spring of the pump 14 to make the suction stroke.

Since the pipe line system 15 has a dip or bend such as 22 therein for draining the oil to points below the metering unit 23 and since a series of such dips which in effect are U-shaped would tend to retain U-shaped columns of oil and thereby possibly trap some of the air pressure and cause flooding of one or more of the units 23, it is desirable to provide in connection with the pipe line system one or more vents or bleeders preferably in the form of quick release valves or bleeders and this I prefer to do by providing a vent valve at each unit 23. This feature will be described more in detail in connection with Figures 22 and 23.

In the event that I should employ a heavy oil dispensing device and a grease dispensing device in the same unit and have both of the same positively operated, that is by mechanical pistons, as shown in the sectional view of Figure 6, it would then be desirable to provide either a positive exhaust valve in connection with one or the other of the motor pistons or preferably a timed release of pressure in view of the desirability of releasing the pressure after the same has been applied a predetermined period.

Where the two devices are a grease dispensing device and a heavy oil dispensing device, both employing motor operated pumps, the mechanically operated exhaust valve is connected to the grease operated pump, since its action will generally be slower than the operation of the heavy oil displacing pump.

In Figures 34, 35 and 36 I have shown a form of timed release which may also be employed. This timed release comprises a T-shaped body member 310 provided with attaching lugs 312 by which the same may be mounted upon a suitable support. The body has a connection at one side by a pipe socket 313 and at the other side by a like pipe socket 314 so that the unit may be cut into the line 5 and communicates with the compressed air supplied to both devices. The lower part or shank is drilled axially and this drilling appears as a counterbore in the upper part of the body, the upper end of the counterbore being closed by a hollow plug 315. The lower end of the plug forms a valve seat for a valve member 316 which has a stem 317 extending centrally through the top of the plug 315. At its upper end the stem 317 is drilled and the side walls adjacent the drilling are pinched together as indicated at 318 in Figure 36 to form a head to limit the downward motion of the valve member 316 with respect to its seat. A compression spring 319 tends to hold the valve member 316 away from its seat a predetermined distance and with a relatively small force so that when air pressure is admitted to the central chamber this valve 316 will immediately be blown to its seat by the air tending to escape around the same and past the stem 317 where it passes through the plug 315.

This valve 316 forms a quick release valve in conjunction with the bleeder which is formed by the lower end of the body and a cup-shaped fitting 320. The lower end of the body is formed as a hollow stem having the passageway 322 therethrough, the upper end of said stem is threaded and the lower end is provided with a helical groove 323 forming a resistance passageway. The cup-shaped member 320 has a threaded upper portion at 324, the open end of which engages the conical shoulder 325 to form a tight joint. An annular chamber 326 is formed by providing a groove in the stem and a corresponding annular groove in the cup member 320. The lower end of the cup member 320 has a cylindrical bore which fits relatively closely the shank where it has the helical groove 323 formed thereupon. The chamber 326 communicates by way of a laterally extending passageway 327 and a vertically extending passageway 328 with atmosphere. A body of liquid stands partly in the bore 322 and partly in the chamber 326 filling the helical resistance groove 323. In operation this release unit tends to hold the pressure in the pipe 5, since the valve 316 will quickly be blown to its seat and held there by internal pressure and the pressure of the air in the bore 322 tends to drive the liquid out of said bore and through the resistance passageway 323 over into the chamber 326.

This is a relatively slow operation in view of the friction presented by the liquid to flow and hence considerable time is consumed in thus driving the liquid out of the bore 322 and the resistance channel 323. As soon as the liquid is driven out of these passageways the air will then escape bubbling up through the liquid in the chamber 326 and escaping to atmosphere. As soon as the pressure has dropped to a predetermined low value, the spring 319 is able to force the valve 316 away from its seat and thereupon air can escape freely past the stem 317 to atmosphere, permitting complete exhaust of all air pressure in the pipe 5 and connected parts.

The grease dispensing device 3 is provided with a pressure release valve 330 (see Figures 1 and 4) which in the embodiment of Figures 3 to 6 inclusive is disposed in a boss 332 formed at one side of the main pump frame 233.

Figure 12:
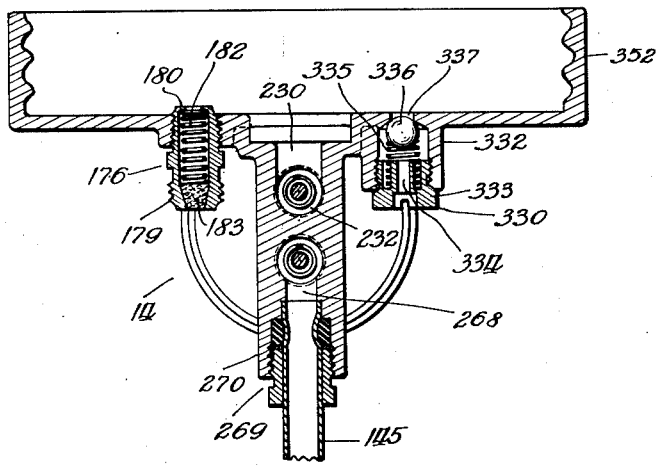
Figure 12 is a vertical section through the supporting bracket taken on the line 12—12 of Figure 10.

This pressure release valve is shown in dotted lines in Figure 4 and in section in Figure 12, and comprises a plug 333 having a central axial hole formed therethrough as shown at 334. The plug has an annular recess forming a spring pocket for supporting the compression spring 335, which compression spring rests against a ball check valve 336 held to its seat to prevent inward flow of air or other fluid, but opening outwardly when the pressure of the spring 335 is exceeded.

The valve port 337 which is controlled by the ball valve 336 opens into the inlet valve housing 232 shown in Figure 6. The purpose of this pressure release valve is to permit the escape of grease after the reservoir 155 is filled. Since continuous pressure of grease through the inlet nipple 176 might result in injury to the follower 163 or bursting of the reservoir, I provide the pressure release valve 330 in communication with the reservoir through the pipe 159 and port 162 to permit the escape of any grease which is forced into the reservoir after the same is filled.

As I shall point out in connection with Figure 12, the pressure release valve for preventing the building up of an undue pressure in the grease reservoir may be mounted at any convenient point where direct communication is had with the interior of the reservoir. In the form shown in Figure 6 the pressure release valve is located on the top frame where it communicates with the reservoir through the suction pipe, whereas in the form shown in Figure 12 the valve 330 which is there shown in section communicates with the bottom of the reservoir since the bottom of the reservoir is there formed of a metal bottom plate.

The construction of the valve 330 as shown in Figure 4 and that shown in Figure 12 is the same except for the communication of the release port or passageway 337 which in the one case communicates with the pump intake connection and indirectly with the reservoir and in the other case directly with the bottom of the reservoir.

For filling the reservoir with grease the wing nut 158 may be unthreaded from the bottom of the tube 159 and the reservoir dropped and filled with grease as by means of a paddle or any other manner. The stop ring 184 prevents the follower 163 from slipping off of the guiding tube 159 and the follower is thereby retained above the tube when the glass reservoir is thus dropped.

In Figure 7 I have shown a modified form of the unit 2, the modification resides in the manner of supporting the glass reservoirs 155a and 156a which correspond to the reservoirs 155 and 156 of Figure 3. These reservoirs 155a and 156a are alike and comprise large bowl shaped containers having cylindrical side walls and rounded bottoms which are closed. These reservoirs are supported from their upper ends so as to form depending bowls, whereas in the form shown in Figure 3 the reservoirs are supported from the bottom by tension members and wing nuts secured to the tension members and bearing against the lower ends of the bowls.

The reservoirs 155a and 156a have their upper margins or flanges formed with external coarse screw threads 338, these threads cooperating with threads formed upon the insides of the depending flanges 153a and 154a. Since the reservoirs are closed at their bottoms, the suction pipe 159a is capped as indicated at 339 to close the lower end of the suction tube below the inlet opening 162a. The grease reservoir 155a is filled by unscrewing the reservoir from its socket. The follower is prevented from leaving the tube 159a by engagement of the guiding sleeve 167 with the cap 339 on the lower end of the tube. In the oil dispensing device the reservoir 156a need not be removed in order to fill the same since oil may be poured into the openings covered by the closures 274. Since the oil reservoir 156a is supported at its upper margin the oil displacement chamber 283 does not require the stud 277 and hence the same is dispensed with, the screen 295 being continuous across the bottom and the cap member 282 having an opening therein for the inlet check valve 290. Otherwise the construction is the same as shown in Figure 5.

In the embodiment shown in Figures 8 to 14 inclusive the reservoirs are supported from the bottom and instead of being depending from the main frame as in the embodiment of Figures 3 to 6 they extend upwardly from the supporting base.

In this construction there is a base frame member 340 having a bracket 344 with three openings in the bracket 345, 346 and 347 for securing the frame 340 to the dash board or bulk head of an automobile or the like. A supporting web 348 between the bracket portion 344 and the main frame portion serves to strengthen the construction. The glass reservoirs 342 and 343 are alike in construction and comprise glass cylinders having their end rims thickened and provided with external screw threads. Both ends may be made alike, but I prefer to make the threaded portion 349 at the lower end slightly longer than the threaded portion 350 at the upper end since a greater hold is desired at the bottom of the glass reservoirs than at the top. The reservoir 342 is adapted to contain grease, it is threaded into a socket formed by the vertically extended threaded flange 352. The reservoir 343 is adapted to contain relatively light oil and it is likewise secured in a socket formed by the upwardly extending flange 353. Gaskets 354 of cork or like yielding material are engaged by the lower ends of the glass reservoirs to form fluid tight joints. Domed cover members 355 and 356 formed of sheet metal are provided with cylindrical flanges 357 and a knurled bead 358. Instead of forming screw threads about the entire flanges 357, I provide a series of depressions 359 spaced on the proper pitch of the screw threads of the threaded margins 350, thereby forming an interrupted screw thread.

Circular gaskets 360 formed of cork or a like yielding material have their outer margins disposed within the knurled beads 358 and are adapted to engage the upper end faces of the reservoirs to form fluid tight joints. Breather openings 362 and 363 are formed in the cover members 355 and 356 respectively for communication with atmosphere. The grease dispensing device is shown in section in Figure 10 and it has the grease pump 14 formed as an integral part of the main frame member 340 and instead of being disposed at the top of the reservoir as in Figure 6 it is now disposed at the bottom of the grease reservoir. The construction of the grease pump 14 is substantially identical with that shown in Figure 6, the intake passageway 230 into the inlet valve chamber 232 being, however, at the top instead of at the bottom and the discharge pipe 145 extending downwardly in Figure 10 instead of upwardly in Figure 6. Since the details of construction are the same as shown in Figure 6 and have heretofore been described in detail, the construction of the grease pump 14 in this embodiment will be clear from the previous description. The grease reservoir 342 is provided with a follower 163 which in all material respects is like the follower 163 shown in Figure 6, this follower having a sleeve 167a which is guided upon a rod or stem 365 secured to the cover member 355 centrally.

The lower end of the stem 365 has a recess 366 formed therein to receive the tension spring 367, the inner end of the spring being supported upon a cross pin 368. The lower end of the spring is hooked through an eye 369 secured to the stem of a cut-off valve 370 which is adapted to close off the suction passageway 230 when the supply of grease in the reservoir has been substantially exhausted. The spring 367 normally holds the cut-off valve 370 away from the seat formed in the bottom plate 340 over the passageway 230, that valve being held against the end of the stem 367. The follower 163 is provided with a flange or tubular extension 372 which when the follower is in substantially its lowermost position, forces the cut-off valve 370 against its seat to cut off communication between the pump 14 and the reservoir 342. The lowermost end of the stem 365 is flared out at 373 to prevent the follower sleeve 167a from coming off of the stem 365. Thus when it is desired to fill the reservoir 342 with grease the cover member 355 is turned to unscrew the same from the glass reservoir, whereupon the follower and cut-off valve may be lifted out of the reservoir 342 and the reservoir filled with grease. The follower is raised to its uppermost position on the stem 365 when the reservoir is full of grease and the stem 365 with the cut-off valve 370 are plunged down through the grease to a position adjacent the opening of the suction passageway 230.

The pump 14 has its compressed air connection through the port 260 which communicates by the branch pipe 25a (see Figures 8 and 9) with the main air supply pipe 5 through a T connection formed in the boss 374. The boss 374 has a socket 375 into which the end of the branch pipe 25a is connected, the socket 375 and boss 374 are drilled to provide an L-shaped passageway shown in dotted lines in Figure 9 at 376, this passageway opening at 377 (Figure 11) into the passageway 378 formed in the boss 374. The boss 374 has a socket which through the compression coupling 379 makes connections with the air supply pipe 5. A pipe 380 is set in a recess in the boss 374 to provide direct communication with the passageway 378 and this pipe 380 extends to a point adjacent the top of the reservoir 343.

A concentric pipe 382 extends to a point slightly above the top of the pipe 380 and is closed at its upper end by the cap 383. The lower end of the pipe 382 is set in a socket in the main frame member 340, this socket 384 extending upwardly above the bottom wall of the reservoir formed by the main frame 340. A passageway 385 extends downwardly to a cross-passageway 386 suitably formed by drilling or otherwise and this cross-passageway which communicates with the pipe 382 in turn communicates with a U-shaped passageway 387, the remote arm of which communicates with the vertically disposed pipe 388 within the displacement chamber 389.

The pipe 388 is set in a socket concentric with a vertical leg of the U-shaped passageway 387 and its purpose is to permit the escape of air from the upper end of the displacement chamber 389 when the chamber 389 is filled by gravity from the contents of the reservoir 343. The reservoir member 389 is a cylindrical member closed at its top, the top being provided with a hollow boss 390 preferably formed hexagonal in shape so as to be engaged by a socket wrench. The lower end of the chamber member 389 is threaded into a threaded socket or recess formed in the bottom of the wall of the chamber. The lower margin of the chamber member 389 is flanged in slightly so as to secure a good bearing against the gasket 392 which lies upon the bottom wall of the pocket or recess. This gasket 392 has a polygonal opening 393 at the center thereof, the margins of the opening overhanging a circular pocket forming a housing for the inlet check valve 395. The gasket 392 also has an opening 396 registering with the discharge passageway 397, which passageway communicates with a vertical passageway 398. The vertical passageway 398 communicates with the pipe 399 which is set in a socket in the boss 400. The pipe 399 extends up to the upper end of the reservoir 343 and is closed at its upper end by the cap 402. A concentric pipe 403' extends from a point a short distance below the cap 402 down into a socket 403 formed in the boss 404.

The outer end of the boss forms a socket 405 for the connection to the compression coupling 406 with the discharge pipe 16 of the pipe-line system 15.

Figure 14:
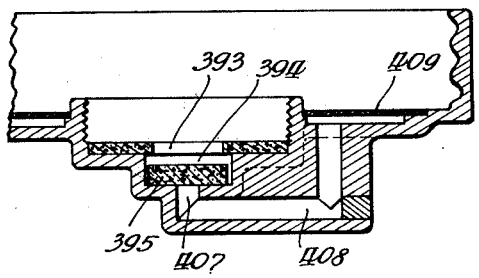
Figure 14 is a fragmentary sectional view through the inlet passageway and check valve of the light oil dispensing unit taken on the line 14—14 of Figure 13.
Figure 13:
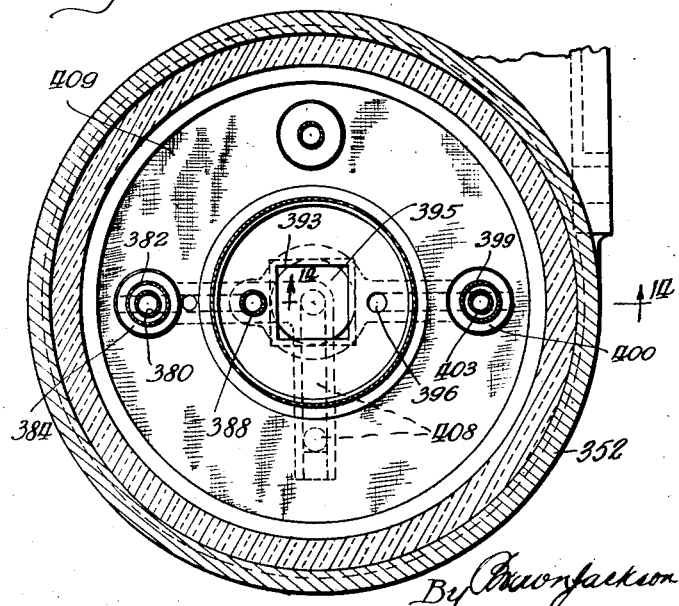
Figure 13 is a horizontal section taken on the line 13—13 of Figure 11 through the light oil dispensing unit.

The inlet check valve 394 overlies a port 407 communicating through a U-shape passageway 408 with the interior of the reservoir at one side of the displacement chamber 389, (see Figure 14). The opening 393 in the gasket 392 is preferably a square opening, the corners of which extend beyond the edges of the round inlet check valve 395 so as to provide a free passageway for oil around the valve 395 when said valve is opened. This may be seen more clearly in Figure 13. A screen member preferably a flat circular disk 409 provided with suitable openings to pass over the displacement chamber 389, the pipes 382, 399 and 410, has its margin gripped between the gasket 355 and a shoulder formed on the base plate 340 to screen the contents of the reservoir 343 before they pass into the U-shaped inlet passageway 408.

The return pipe 17 of the pipe-line system 15 is connected through a suitable compression coupling 412 in the boss 413 formed on the base member 340. This connection is shown more clearly in Figure 9. The pipe 410 which forms a continuation of the pipe 17 projects up through the reservoir 343 to a point adjacent the top of the same.

It is adapted to return to the reservoir 343 the surplus of oil which was not delivered to the metering units of the pipe-line system 15. The vent 363 in the cover member 356 permits the escape of the compressed air to atmosphere.

The reservoir 343 is filled with oil, as by removing the cover 356. Oil then flows through the inlet passageway 408 after passing the screen 409, past the inlet check valve 395 into the measuring and displacement chamber 389 expelling the air from said chamber by way of the pipe 388, passageways 387, 386, pipe 382 and pipe 380 into the air supply pipe 5 which, as will be remembered by reference to the air supply unit, provides free communication with atmosphere through the vent through the screen 114 back of the pressure control discharge valve 118. Liquid tends to follow the air and will rise in the space between the pipes 380 and 382 to a level corresponding to the level of oil in the reservoir. Likewise the oil will flow out of the discharge passageways 396, 397 and 398 into the space between the pipes 399 and 403 to the corresponding level in the reservoir.

As soon as a charge of compressed air is admitted through the pipe 5 the valve 118 closing off the atmospheric vent back of it, liquid will be driven out of the space between the pipes 382 and 380 through the chamber 389 and out to the discharge pipe through the outgoing pipe 16 of the pipe-line system 15 and thence to the metering unit where suitable doses of oil are retained by the metering unit, the surplus of oil then being driven ahead of the compressed air through the return pipe 17 of the pipeline system and up through the pipe 410 into the reservoir 343, the oil settling back into the reservoir and the air escaping by way of the vent 363.

At the same time that the oil pressure is applied to the oil dispensing unit, the compressed air is applied to the grease pump 14 to operate the same to make a discharge stroke. Pressure is retained upon the grease pump 14 until the pressure is depleted by either or both of the threading means, viz. the valve 118 which connects the pipe 5 to atmosphere and the discharge to atmosphere which occurs when the air has driven the surplus of oil through the pipe-line system 15 back to the reservoir 343. Generally the valve 118 will remain closed until such time as the surplus oil has been driven back to the reservoir and the major part of the charge of compressed air has escaped at that point from the system whereupon the pressure in the pipe 5 will have dropped to a point which will permit the valve 118 to open to connect the pipe 5 directly to atmosphere. In case an air supply unit or air supply means is provided which does not have a vent directly to atmosphere, the bleeder and quick release valve previously described in connection with Figures 34 to 36 may be employed. Also, preferably, in conjunction with the oil distributing pipe-line system 15, I provide atmospheric vents at the metering units, as will be described more in detail in connection with the pipeline system and Figures 21, 22 and 23.

Triplex system

While I have described in connection with Figure 1 and Figures 3 to 14 inclusive the duplex system of lubricant dispensing where two grades of lubricant are employed, I shall now describe a triplex system in connection with Figures 3 and 15 to 18 where three grades of lubricant are to be dispensed and distributed to the bearings. In this case there is a top frame plate 415 providing three separate covers for the grease reservoir 155, the heavy oil reservoir 416 and the light oil reservoir 417. This frame member has a suitable bracket 418 back of the heavy oil dispensing unit 29 and a like bracket 419 back of the grease dispensing unit 28.

Each of the units 29 and 28 have spring plug members 274 with handles 275 closing openings in the top frame plate 415 through which lubricant may be introduced into the respective reservoirs. Similarly the unit 30 has a closure 274 provided with a handle 275 closing a filling opening for the introduction of light oil into the unit 30. The construction of these closures is shown in section in Figure 18. The units 28 and 29 also have safety release valves 330 and filling nipples 176—176 through which suitable lubricant may be introduced into the respective reservoirs.

The grease dispensing unit 28 is in all material respects constructed like the grease dispensing unit 4 shown in section in Figure 6. The low-level cut-off valve employed in the unit 28 is, however, like that shown in Figure 19 instead of the overrunning sleeve and port 162 as shown in Figure 6. The description of the structure shown in Figures 6 and 19 may therefore be applied to the grease dispensing unit 28 in the triplex system.

The heavy oil dispensing unit 29 is substantially the same as the grease dispensing unit with the exception, however, that the low-level shut-off valve instead of being operated by the grease follower 163 is controlled by a float 420 as shown in Figure 37. The float 420 is shown in dotted lines in Figure 15 in its lowermost position such as occurs when the reservoir is empty. In Figure 37, float 420, is shown in a similar position holding the disk valve 185 closed which is like the valve 185 shown closed in Figure 19. The valve disk 185 is carried in a cage formed by the double flanged member 199, the lower flange of which extends inwardly under the margin of the disk 185. The top plate 198 of the cage is flanged downwardly to guide along the surface of the pipe 159 as indicated at 422.

The float 420 which is preferably a body of cork has a top plate 423, the plates 198 and 423 being connected together upon the body of the float 420 as by wires 424 extending through the body of the float. The top plate 423 has an upwardly extending flange 425 also serving as a guide upon the pipe 159. The upward rise of the float 420 is limited by the stop ring 427 which is a spring ring resting in a notch or circumferential groove on the outer surface of the pipe 159. The downward travel of the float is limited by the engagement of the inwardly extending flange on the housing member 199 with the outwardly extending bead 189 on the sleeve or shell member 188 which forms the outer wall of the annular passage terminating in the valve port. In all other respects the oil dispensing unit 29 for supplying and discharging heavy oil is constructed like the grease dispensing unit 28 and the structure of the pump is as shown in Figure 6. No grease follower is necessary in connection with heavy oil since the oil will maintain its own surface and the float 420 controls the low-level shut-off valve.

Figure 18:
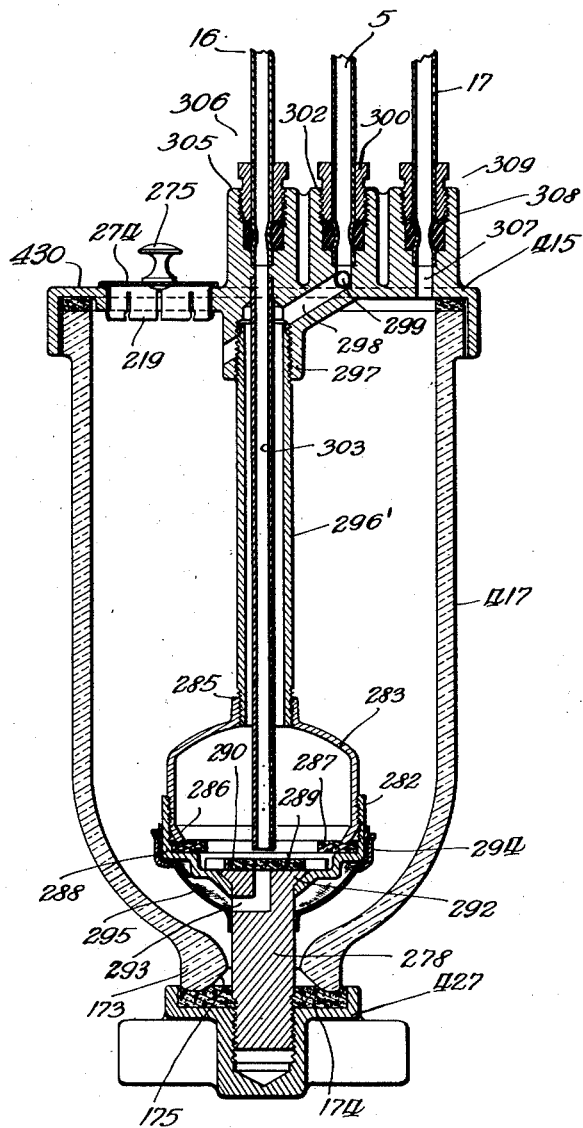
Figure 18 is a vertical cross-section taken on the line 18—18 through the light oil dispensing unit.

A light oil dispensing unit 430 is shown in section in Figure 18. Its construction is, on the whole, substantially identical with the construction of the unit 4 shown in Figure 1 and in section in Figure 5.

The wing nut 427 which is threaded on to the lower end of the stud 278 does not have a filling nipple but forms a closed cap for the stud 278 since the capacity of the reservoir 417 is relatively small and the said reservoir is charged with light oil through the opening in the top which is normally closed by the closure 274. The glass reservoir 417 is held against the top plate 415 by the wing nut 427, the stud 278, displacement chamber 283 and pipe 296. Since the construction of the main operating parts of the device shown in Figure 18 are substantially identical with those shown in Figure 5 and the same reference numerals have been applied to each, an extended detailed description is not believed to be necessary. The pipes 16, 5 and 17 are arranged in a row back of the filling opening, the pipe 16 being centrally disposed. The pipe 5 is back of the pipe 16 and the return pipe 17 is back of the air supply pipe 5. The two branch air pipes 32 and 33 leading to the heavy oil and grease dispensing devices 29 and 28 respectively are connected to the air supply pipe 5 at the boss 302 where the compression coupling 300 connects the air supply pipe 5 with the air passageway 298 leading to the light oil dispensing unit 30. As shown in Figure 2 these pipes 32 and 33 extend from the pump unit 52 and 14 to the boss 300 where a four-way connection is made between the pipe 5, pipes 32 and 33 and the passageway 298.

The opening to one of the branches is shown at the port 299, in Figure 18.

The operation of a triplex system which has heretofore been mentioned will now be better understood. When the air supply unit 6 supplies a charge of compressed air through the pipe 5 the air is delivered simultaneously to the two pneumatic positive pumps 52 and 14 to displace the pumping pistons and to discharge heavy oil and grease respectively into the pipe-line systems connected to the same. The pipe-line systems for the heavy oil and grease are what may be termed closed-end systems, lubricant being supplied at one end of the system and being distributed throughout to the various bearings through suitable resistance units or the like. The unit 30 which has a pneumatic displacement chamber 283 filled by submergence pressure of light oil in the reservoir 417, operates at the same time and drives a charge of light oil through the pipe 16 into the pipe-line system 15, past the receiving basins or pockets of the respective bearings, the surplus being then returned through the return pipe 17 and discharged into the reservoir 417.

The reservoirs 416 and 155 are vented to atmosphere by vents 428 extending through the top wall of the respective units, that is through the wall of the frame plate 415 as illustrated in section in Figure 17.

The top plate 415 has a boss 429 formed thereupon, this boss being apertured and provided with four wings 430 extending above the boss and extending radially inwardly from the margins of the boss. A sheet metal cap or cover member 432 loosely embraces the aforesaid wings and rests upon the upper edges of the same. This cap or cover 432 is held in place by a hollow rivet 434 the inner end of the rivet being split or expanded over the inner ends of the wings 430. This provides a series of free passageways to atmosphere underneath the hood or cover 432 which tends to keep out dust, dirt and the like.

The unit 30 is likewise provided with a vent for the escape of the compressed air which is discharged into the same at the end of a lubricating operation.

I shall now describe more specifically the pipe-line system and the means employed for securing distribution of the lubricant to the various bearings of the system or machine served by my invention.

Referring, first, to the grease distributing system such as the pipe-line system connected to the pipe 7 in Figure 1. The means for securing equal emission where equal emission is desired at the various bearings, is the resistance units 13 shown in section in Figure 24.

The unit 13 comprises a substantially cross-shaped body 435, having pipe sockets 436 and 437 at the opposite sides thereof, these sockets preferably being in alignment. A vertical bore extends through the unit 13 intersecting the sockets 436 and 437. The ends of the connecting tubes or pipes, such as 438 and 439, are inserted in the sockets 436 and 437, these sockets being constricted as indicated in Figure 24 by stamping or swaging the outsides of the sockets 436 and 437 in a suitable tool or die to cause the socket definitely to grip the pipes 438 and 439 and to constrict the same a short distance from the inner ends of such pipes.

The main vertical body portion comprises a hollow shank 440 terminating in a flared or outwardly extending flange 442. A hollow threaded plug or sleeve 443 embraces the shank 440 above the flared out or flanged portion 442 being provided with a hexagonal portion 444 and below it a threaded portion 445 adapted to be threaded into a threaded socket 446 formed on the bearing 447. The threads 445 are straight threads, that is they are not tapered or pipe threads, since the tightness of the threads is not depended upon to make a fluid tight joint. The flared lower end 442 is forced into engagement with a gasket or yielding washer 448 seating in the bottom of the threaded pocket or socket formed as a part of the bearing 447.

A passageway 449 extends from the bottom of the pocket or socket into intersection with one or both of the bearing surfaces.

A removable plug member 450 having an upper hexagonal head provided with a conical sealing shoulder 452 has a threaded portion 453 which is threaded into the upper end of the body portion 435. A resistance plug member or body 454 is connected to the upper threaded portion 453 by a stem 455 of reduced diameter, this stem embodying a degree of flexibility to the connections between the parts and providing also a passageway around the same between the pipes 438 and 439.

The resistance plug or body portions 454 is provided with a helical groove 456 of relatively large cross-sectional area. It will be observed that I do not employ any screen in connection with the grease and hence the impurities which may be expected in the grease must be capable of passing through the resistance passageway 456. I have found that a resistance conduit of not less than $\frac{1}{32}$ inch inside diameter will pass most of the impurities usually found in grease, while an inside diameter of $3/64$ of an inch will pass through it all the usual impurities found in cup grease or commercial grease now found on the market.

If the passageway should be clogged due to extraordinarily large particles or impurities in the grease or due to open storage and the like, the same may readily be cleaned by unscrewing the plug member 453 by the use of a wrench upon the exposed head 450, whereupon the entire plug may be withdrawn and the resistance conduit cleaned out and likewise if the passageway 449 should become clogged the entire unit may be uncoupled from the socket 446 by means of a hollow plug or sleeve 444. The pipe-line system may be specially prepared to reduce the friction of flow of the grease therein and a special form of grease may be employed as heretofore disclosed and claimed by me. While I have shown in Figure 24 a T connected unit, obviously an L-shaped unit may be similarly constructed. In this event one of the pipe sockets, such as 437, is left off. The pipe-line system and resistance unit bodies are preferably pre-assembled and then are connected in place by means of the screw couplings 443. The resilient gasket 448 is not always essential with grease and may optionally be dispensed with.

In Figure 25 I have shown the same unit as that shown in Figure 24 except that instead of coupling the unit to the bearing socket with a threaded coupling, the shank 440 is driven into the cylindrical socket of the boss 457.

The head 450 forms a suitable face by which the unit may be driven in place. Except for the drive coupling instead of the screw coupling, units shown in Figures 24 and 25 are alike.

The advantage of grease in centralized lubricating systems, in fact in all systems of lubrication, is its ability to retain a definite form, that is to stay in place and not leak out of minute openings as a liquid lubricant always tends to do. For this reason the grease is well adapted to the lubrication of bearings which have cavities in conjunction therewith or outlets which are difficult to seal fluid tight.

For more rapidly rotating bearings, or bearings which may be sealed substantially fluid tight, a lighter oil is preferable. In the duplex system, shown in Figure 1, the latter type of bearings are supplied with light oil by the light oil dispensing device 4 and the pipe-line system 15 through metering unit such as 23. The construction of the metering unit is shown in detail in Figures 21, 22 and 23. Each metering unit 23 has a substantially cross-shaped body portion 458, having pipe sockets 459 and 460 at the sides in alignment with each other to which the links or tubes between the unit may be connected, as by swaging, as shown in connection with Figures 24 and 25, or by soldering, if desired.

The body 458 has a vertical bore, the upper end of which is closed by a hollow screw plug 462, this screw plug having a tapered shoulder 463 to make a tight joint. A vent opening 464 is formed through the top of the plug, this vent opening terminates in a valve seat 465. The valve seat is surrounded by a spring pocket, in which there is disposed a light compression spring 466. The spring 466 engages a valve member 467 which is preferably a plug of cork or the like, normally resting upon a series of fingers 468 extending radially inwardly from the bottom of the plug member 462. The cork valve 467 is normally in its lower position under the influence of the spring 466, but upon the admission of pressure to the interior of the unit 23, the valve 467 is forced upwardly against its seat closing off the vent opening 464. Likewise, liquid arriving in the body of the unit 23 tends to float the cork plug 467 upwardly assisting in the action of closing the same.

The lower end of the body portion 458 comprises a cylindrical shank 470 the lower end of which is flared out as shown at 472. A sleeve coupling 473 having an upper hexagonal end and a lower threaded cylindrical portion embraces the shank above the flange 472. This coupling plug 473 has straight threads adapted to thread into a socket 474 formed as a part of the body 475 of the bearing.

A passageway 476 from the bottom of the hollow shank 470 extends into the bearing. A gasket 448 of yielding material is seated in the bottom of the recess and the flange portion 472 is forced into engagement with the same by the coupling sleeve 473, when it is threaded into the threaded pocket or socket formed in the bearing. The shank 470 has an inwardly extending flange 477 upon which a compression spring 478 rests. This spring 478 tends to support a ball check valve 479, the ball check valve being of a diameter slightly less than the upper end of the bore of the body member 470. A shoulder 480 is formed in the lower part of the bore of the body and with this shoulder the ball valve 479 cooperates to form a tight seal of the outlet of the body, when oil under pressure is admitted to the interior of the body.

The ball 479 is prevented from rising above a definite position by means of the screw 482, the screw 482 being threaded into a boss 483 at the side of the body and if it is desired to remove the ball valve 479, the plug 462 may be removed and the screw 482 likewise removed, whereupon the ball 479 and the spring 478 may be withdrawn from the interior of the unit. The screw also tends to catch oil by contact and insure filling of the trap basin.

Instead of coupling the metering unit to the bearing by the threaded coupling member 473, the shank of the unit may be made cylindrical and driven into a socket, such as 484, on the bearing frame 475. Such construction is shown in Figure 23.

In the operation of the light oil dispensing and distributing device and the pipe-line system 15 connected thereto, upon the application of pressure to the displacement chamber 283, the inlet check valve such as 290 is closed to shut off the inlet port and the oil which is contained in the displacement chamber 283 is driven out through the pipe 303, as shown in Figure 5, and passes out through the pipe 16 until the contents of the chamber 283 down to the lower end of the pipe 303 have all been discharged. The diameter of the pipe 16 and pipe 303 is of the order of ⅛ inch inside diameter and it will be seen that the usual lubricating oil, such as is employed for lubricating such bearings as the electric starter, generator, distributor bearing, etc. will tend to pass out as a slug through the pipe 16 followed by the compressed air which in expanding drives the oil in a body ahead of it. As the oil reaches successively the metering units 23, the ball check valves 479 are forced to their seats and likewise the vent valves 467 are forced upwardly to their seats cutting off the vents 464.

The body of each metering unit between the ball check valve and the pipe connections such as 459 and 460 is filled by gravity with oil from the slug or charge passing through the system, the surplus then being driven on ahead through the remainder of the system to the next unit which is closed and filled until the surplus of oil and the following air are discharged back into the reservoir 156. When the surplus of oil has been discharged back into the oil supply reservoir, the following air flows through the system and tends rapidly to drop to atmospheric pressure. However, it is to be observed that the oil which adheres to the walls of the pipe-line system, begins to gravitate and collect as soon as the velocity of the air decreases beyond a critical point, with the result that slugs of oil will tend to form in the dips or bends such as 22, between units. Such slugs of oil will tend to retard the complete evacuation of the system and hence a certain amount of pressure might be retained which would cause some of the slugs of oil to be raised to the level of the metering units 23 and cause oil in excess of the predetermined amount to be delivered to the bearings.

It is intended that as soon as the surplus of oil has been discharged from the end of the system back into the reservoir, that the dropping of air pressure in the pipe-line system will permit the springs 478 to raise the check valve 479 to open the passageway into the bearings so as to permit the oil retained in the pocket or chamber of each of the units to gravitate into the bearings to lubricate the same.

In order to avoid the trapping of air which might cause unequal distribution of oil at the bearings, where equal distribution is desired, or otherwise upset the predetermined metering ability of the system, the units 23 or certain ones of them are provided with the vent valves 467 which open as soon as the pressure drops to a predetermined low value opening an atmospheric vent 464 to the exterior of the corresponding metering unit and the connected parts of the pipeline system.

Now it is to be observed that the grease pump 14 which is supplied with compressed air at the same time that the displacement chamber 283 is supplied with compressed air will have made a discharge stroke by the time that the surplus of oil and following air are discharged back into the oil supply reservoir. In fact it will tend to complete the stroke while the air pressure is relatively high and has not dropped due to expansion in the oil distributing system.

The tendency of the return spring 257 of the grease pump 14 is to force the motor plunger back into extreme outer position as shown in Figure 6 and at the same time draw in a charge of grease into the pump cylinder. If the air is not permitted to escape from the system back pressure in the motor chamber will retard and may block the suction stroke of the grease pump. It is, therefore, desirable that complete evacuation of back pressure be obtained. This can, in each case, be obtained by the employment of the vent valve at the metering unit 23, although this is a refinement over the broad use of the oil displacement system and pipe-line system connected thereto, serving as a vent for the grease pump 14. Likewise, as above pointed out, the air supply unit in the present embodiment provides an open vent to atmosphere. Where an auxiliary source of compressed air, such as the air brake system of a vehicle is available, and a manual control valve with a suitable reservoir is employed for applying a predetermined charge of compressed air to the system, it is not convenient to employ an atmospheric connection at the control valve and hence the venting of the compressed air through the light oil distributing system is relied upon or separate venting means is provided.

The employment of the resistance unit shown in Figure 24 or 25, in my system, is not essential as other forms of measuring valve units or metering units may be employed. Where in a duplex system, for example, heavy oil and grease or light oil and grease, or two grades of oil are dispensed by the use of positive displacement pumps, a suitable exhaust valve or a bleeder such as is shown in Figures 34 to 36 are provided for permitting the escape of the compressed air after the same has made the desired working stroke of the unit.

In the duplex system it is intended that the air supply unit shall supply a charge of compressed air at certain predetermined intervals, such as for example fifty miles of road travel. The metering unit for light oil and the metering unit for grease are so proportioned and the displacement of the respective air displacement pump and grease pump so proportioned that the bearings, even though of different class and provided with different lubricants, secure the proper amount of lubricant for the predetermined amount of road travel or time interval of operation. The same interrelation is found in the triplex system.

For the heavy oil distributing or metering units, as in the triplex system, valves are provided in the metering units and the metering units preferably have resistance plugs.

A suitable construction of metering unit for the distribution of heavy oils is shown in Figure 26 and a modification thereof in Figure 27. The main body of the unit is substantially identical with the body of the unit shown in Figure 24, except that in Figure 26 an elbow or terminal unit has been shown, where in Figure 24 an intermediate or T-shaped element has been shown. The internal bore of the unit is preferably somewhat smaller and the size of the helical groove 485 is smaller because of the greater fluidity of the heavy oil and because the same can be screened, impurities tending to settle out of oil by gravity. The plug 454 which bears the resistance groove 485 has a cup leather 486 secured to the bottom of the same, as by a pin 487, which is driven into a small hole axially of the plug member 454, the head of the pin 487 engaging the bottom of the cup leather 486. The flange of the cup leather engages the side walls of the bore of the body member and forms a tight seal preventing the entry of air from below. Preferably, but not necessarily, an expanding spring ring 488 is contained within the flange of the cup leather 486 to press the flange into engagement with the side walls for making a fluid-tight joint. The expanding ring 488 is optional. The heavy oil passing through the groove 485 passes freely past the cup leather 486 in a downward direction toward the outlet passageway 449 and into the bearing, but when pressure in the pipe 438 ceases, the cup leather 486 expands again into contact with the side walls of the bore in which it is located and prevents the entry of air at any of the units.

It will be understood that if air could enter at a higher unit the pipe-line system which is full of heavy oil would tend thereupon to drain out through some of the lower units by gravity. This cup leather forms in effect a check valve, permitting the free passage of lubricant into the bearings, but preventing air from entering through any of the bearings and draining the pipe-line system, or causing a disturbance otherwise.

The unit shown in Figure 27 is like the unit shown in Figure 26 with the exception that the shank 440 has a drive fit with the socket 457, as explained in connection with Figure 25. The construction of the sealing plug 453 and the resistance plug 454 in the embodiment shown in Figure 26 is substantially the same as that shown in Figure 24 in all material respects.

In the operation of the triplex system, grease is supplied to the cavity type bearings, such as axle bearings, wheel bearings, king pin bearings, tie rod bolts, steering gears, drag links and the like, where either from the character of the bearing itself it is desirable to maintain the cavity filled with lubricant to provide a proper supply of lubricant or to prevent the deposit thereinto of dirt or foreign matter, or where from the nature of the bearing it is not feasible to make a sufficiently tight joint to prevent oil from draining out of the same.

Such cavity type of bearings have been indicated diagrammatically in connection with Figures 1 and 2 by showing cavities at the sides of the bearings.

For lubricating bearings, such as shackle bolts, shock absorber connections, brake hangers, and certain brake mechanism, where the motion is relatively slow and where the bearings are exposed to the weather, road dust, or the like, a heavy or high viscosity oil is preferable. Such bearings have generally a rocking motion accompanied by more or less pounding or slapping of the bearing parts. For these bearings, a heavy oil distributing device and system are employed.

Since in the triplex system the thin oil is used on a limited number of bearings, the reservoir is reduced in size to correspond to the amount of oil used. Since the duty of lubricating all of the bearings is divided between the three devices, the periods between the refilling of the triplex reservoirs may easily be as much as a year on an average mileage of 10,000 miles per year.

The scheme of filling shown in Figure 19 may be employed for both the heavy oil reservoir and the grease reservoir in the triplex system.

The pipe-line system for grease is preferably of an inside diameter, not less than ⅛ths of an inch. The oil line for heavy oil may, if desired, be of smaller diameter in view of the lower resistance to flow, whereas the diameter of the light oil distributing pipe-line system may be considerably smaller as heretofore indicated.

I do not intend to be limited to the details as shown and described.

I claim:

1. In a system of the class described the combination of a first lubricant dispensing device comprising a compressed air operated motor member, a second lubricant dispensing device comprising a pneumatic displacement pump having a discharge pipe leading to atmosphere, means for supplying a charge of compressed air in common to both of said devices, said discharge pipe leading to atmosphere being adapted to relieve the pressure in said second lubricant dispensing device after an operation of the pneumatic displacement pump by a charge of compressed air, and a spring for repositioning said air operated motor member after the pressure in said second lubricant dispensing device is relieved.

2. In a system of the class described the combination of a first lubricant dispensing device comprising a compressed air operated motor member, a second lubricant dispensing device comprising a pneumatic displacement pump having a discharge pipe opening to atmosphere, automatically operating means for periodically supplying charges of compressed air in common to both of said devices, said discharge pipe opening to atmosphere being adapted to relieve the pressure in said second lubricant dispensing device after an operation of the pneumatic displacement pump to permit the return of said air operated motor member.

3. In a system of the class described the combination of a lubricant pump having a pressure fluid operated motor member, a pipe-line system connected thereto, bearings to be lubricated, metering units between the pipe-line system and the bearings, means to provide a charge of compressed air to said motor member and means independent of the motor member for exhausting the charge of compressed air to atmosphere, said latter means comprising a liquid sealed passageway leading to atmosphere.

4. In a system of the class described the combination of a lubricant pump having a pressure fluid operated motor member, a pipe-line system connected thereto, bearings to be lubricated, metering units between the pipe-line system and the bearings, means to provide a charge of compressed air to said motor member and means independent of the motor member for exhausting the charge of compressed air to atmosphere, said latter means comprising a liquid sealed passageway leading to atmosphere and a quick release valve for effecting the complete release of fluid pressure.

5. In combination in a system of the class described a pneumatically operated lubricant dispensing pump having a piston, a pipe-line system therefor having outlets to bearings to be lubricated, a pneumatic displacement pump, a pipe-line system for receiving the discharge of said pneumatic displacement pump extending to atmosphere and having along its length liquid traps for retaining doses of lubricant for the bearings to be lubricated thereby and unitary automatic means for periodically and alternately applying a charge of compressed air to both of said pumps, said pipe line system extending to atmosphere being effective after a discharge operation of said pneumatic displacement pump for releasing the charge of compressed air to the atmosphere.

6. In a system of the class described the combination of a pneumatically operated positive displacement pump, a pneumatic displacement pump, a common pneumatic connection, means for supplying a charge of compressed air to said connection, and means effective after a discharge operation of said pneumatic displacement pump to vent the charge of compressed air to the atmosphere for controlling the priming of said pneumatically operated positive displacement pump.

7. In a system of the class described the combination of a pneumatically operated positive displacement pump, a pneumatic displacement pump, a common pneumatic connection, and means for supplying a charge of compressed air to said connection, and means comprising a quick release valve for exhausting the pneumatic pressure from both of said pumps when the pressure has dropped to a predetermined value.

8. In a system of the class described in combination a pneumatically operated positive displacement pump, a closed pipe-line distributing system connected thereto, a pneumatic displacement pump, an open ended pipe-line distributing system connected thereto, said open ended pipe-line system serving as an exhaust connection for both pumps, a common pneumatic connection and means for supplying a charge of compressed air to said connection.

9. In a system of the class described the combination of a pump for relatively heavy lubricant comprising a pump piston, a fluid-pressure motor piston for making the discharge stroke of the pump, a spring for making the return stroke of the pump, a pump for relatively light lubricant, comprising a pneumatic displacement chamber, a discharge pipe for said latter pump leading to atmosphere and a common compressed air supply connection for said pump, said discharge pipe of the pneumatic displacement pump serving as a vent for a charge of compressed air supplied to both pumps.

10. In combination a pneumatically operated positive displacement pump having a motor piston moved in one direction by fluid pressure and having a spring for moving the motor piston in the opposite direction, a pneumatic displacement pump having a pneumatic displacement chamber, means for permitting the exhaust of pneumatic pressure from said chamber upon the completion of a discharge operation thereof, and means for supplying pressure fluid to both pumps, said first named means also controlling the exhaust of fluid pressure from the motor piston.

11. In combination a pneumatically operated positive displacement pump having a motor member actuated by fluid pressure to make one stroke of the pump and having independent means for making the return stroke upon the exhaust of fluid pressure from the motor member, a pneumatic displacement pump having a pneumatic displacement chamber for liquid, means for supplying pressure in common to both pumps and means controlled by said displacement pump for exhausting the fluid pressure from both pumps in common.

12. In combination a pneumatically operated positive displacement pump having a motor member actuated by fluid pressure to make one stroke of the pump and having independent means for making the return stroke of the pump upon the exhaust of fluid pressure from the motor member, a pneumatic displacement pump having a pneumatic displacement for liquid, automatic means for periodically supplying charges of pressure fluid in common to both pumps and means controlled by said displacement pump for exhausting the fluid pressure from both pumps in common.

13. In combination a pneumatically operated positive displacement pump having a motor member actuated by fluid pressure to make a stroke of the pump and having independent means for making a return stroke of the pump upon the exhaust of fluid pressure from the motor member, means for supplying a charge of fluid pressure to the pump and means for exhausting the fluid pressure from the pump, said last named means comprising a pneumatic displacement chamber for liquid and a discharge passageway leading to atmosphere through which the liquid in the displacement chamber must be driven to permit escape of the fluid pressure from the chamber and from the motor member.

14. In combination a lubricating system comprising a closed pipe-line system for distribution of lubricant to bearings under pressure, a lubricating system comprising an open pipe-line system through which a charge of lubricant is propelled by compressed air for distribution of parts thereof to the bearings to be lubricated thereby, a positive displacement pump for the first named system, a pneumatic displacement pump for the last named system, and common means controlled by said displacement pump for operating said pumps in unison.

15. In combination with a machine having two classes of bearings, the first class of bearings having rocking motion of relatively slow speed, the second class of bearings having rotative motion of relatively high speed, a closed pipe-line system having metering units for delivering lubricant under pressure to bearings of the first class, means for forcing a charge of lubricant into said system, an open pipe-line lubricant distributing system having trap basin metering units for trapping doses of lubricant for the bearings of the second class, means for propelling a charge of lubricant through said latter system, and common means for causing operation of both aforesaid means, said common means being in part controlled by an operation of said propelling means.

16. In combination with a machine having two classes of bearings the first class of bearings having rocking motion of relatively slow speed, the second class of bearings having rotative motion of relatively high speed, a closed pipe-line system having metering units for delivering lubricant under pressure to the bearings of the first class, pneumatic means for forcing charges of lubricant into said system, an open pipe-line distributing system having trap basin metering units for trapping doses of lubricant for the bearings of the second class, pneumatic means for propelling a charge of lubricant through said latter system, an air compressor deriving its motion from the machine for supplying compressed air to operate both of said means, and a valve controlled by the operation of said pneumatic means to relieve the air pressure on both of said means.

17. In combination with a machine having two classes of bearings, the first class of bearings having rocking motion of relatively slow speed, the second class of bearings having rotative motion of relatively high speed, a closed pipe-line system having metering units of the resistance type for delivering a relatively heavy lubricant under pressure to bearings of the first class, means for forcing charges of relatively heavy lubricant into said system, an open pipe-line lubricant distributing system having trap basin metering units for trapping doses of lubricant for the bearings of the second class, means for propelling a charge of relatively light lubricant through said latter system, and automatic means partially controlled by an operation of said propelling means for periodically causing a complete cycle of operation of both of said lubricant pumping means.

18. In combination with a machine having bearings of different classes, the first class of bearings being bearings such as axle bearings, having cavities which cannot be maintained fluid-tight, the second class of bearings being bearings such as shackle bolt bearings which are relatively tight but have relatively slow speed rocking motion, the third class of bearings being relatively tight-fitting, high speed rotating bearings, such as generator bearings, a closed pipe-line system for distributing grease under pressure to bearings of the first class, a closed pipe-line system for distributing high viscosity oil under pressure to bearings of the second class, an open pipe-line system for distributing light oil to the bearings of the third class, and common means under the control of one of said systems for causing a complete cycle of operation of all three systems at substantially the same time.

19. In combination with a machine having bearings of different classes, the first class of bearings being such as axle bearings having cavities which cannot be maintained fluid-tight, the second class of bearings being such as shackle bearings which are relatively tight but have relatively slow speed rocking motion, the third class of bearings being relatively tight fitting, high speed, rotating bearings, such as generator bearings, a closed pipe-line system having resistance type metering units for delivering grease under pressure to bearings of the first class, a grease pump for forcing predetermined charges of grease into the pipe-line system at each operation, a closed pipe-line system having metering units of the resistance type with check valve means for distributing heavy oil under pressure to the bearings of the second class, an oil pump for forcing predetermined charges of heavy oil into the pipe-line system at each operation, an open pipe-line lubricant distributing system having trap basin metering units for trapping predetermined doses of light oil for the bearings of the third class, an oil pump for propelling a charge of light oil through said latter pipe-line system to fill the trap basins of the metering units at each operation and means controlled by one of said pumps for causing a complete cycle of operation of said three pumps at substantially the same time.

20. In combination with a machine having bearings of different classes, the first class of bearings being bearings such as axle bearings having cavities which cannot be maintained fluid-tight, the second class of bearings being bearings such as shackle bolt bearings which have relatively slow speed rocking motion, the third class of bearings being relatively tight-fitting, high-speed rotating bearings such as generator bearings, a closed pipe-line system having resistance type metering units for delivering grease under pressure to bearings of the first class, a pneumatically operated, positive displacement grease pump for forcing predetermined charges of grease into the pipe-line system at each operation, a closed pipe-line system having metering units of the resistance type with check valve means for delivering heavy oil under pressure to the bearings of the second class, a pneumatically operated oil pump for forcing predetermined charges of heavy oil into the pipe-line system at each operation, an open pipe-line lupbricant distributing system having trap basin metering units for trapping predetermined doses of light oil for the bearings of the third class, a pneumatic displacement pump for propelling a charge of light oil through said last named pipe-line system to fill the trap basins of the metering unit at each operation and automatic means partially controlled by an operation of said displacement pump for periodically causing a complete cycle of operation of all of said lubricant pumps.

21. In combination with an automobile having bearings of different classes, one class comprising bearings having cavities which cannot be maintained fluid-tight such, for example, as steering gear bearings, a second class of bearings being relatively tight fitting, high speed bearings, such for example as starter motor bearings, a closed pipe-line system having resistance type metering units for delivering a relatively viscous lubricant under pressure to bearings of the first class, a pneumatically operated, positive displacement lubricant pump for forcing predetermined charges of lubricant into the pipe-line system, an open pipe-line lubricant distributing system having trap basin metering units for trapping predetermined doses of light oil having trap basin metering units for trapping predetermined doses of light oil for the bearings of the second class, a pneumatic displacement pump for propelling a charge of light oil through said latter pipe-line system to fill the trap basins of the metering unit at each operation, an air supply reservoir connected to said pump, an air compressor for charging said reservoir with compressed air, said compressor deriving its motion from the motion of the automobile and a pressure release means effective after a discharge operation of said pneumatic displacement pump to vent a charge of compressed air from said latter pipe line system for controlling the priming of said pneumatically operated positive displacement lubricant pump.

22. In combination a frame member a socket on the first side of the frame member, a glass reservoir secured in said socket, a pump mounted on the second side of the frame member having a suction connection leading to the bottom of the glass reservoir, a second socket on the first side of the frame member, a glass reservoir secured in said second socket, a pneumatic pump displacement chamber disposed in the second reservoir, a common air connection for said pump and said chamber, and means for venting the air in said displacement chamber for controlling the priming of said pump.

23. In combination a substantially horizontal frame member having a socket on the first side thereof, a reservoir secured in said socket, a pneumatically operated positive displacement pump mounted on the second side of the frame member, said pump having a suction passageway extending to substantially the bottom of the reservoir, said frame member having a second socket on the first side of the frame member, a second reservoir secured in said second socket, a pneumatic displacement pump having a chamber disposed in the bottom of the second reservoir, and having connections extending through the frame member, one of said connections being a discharge connection from the pneumatic pump and the other connection being a return pipe leading into the second reservoir, and means effective subsequent to a discharge operation of said pneumatic displacement pump for controlling the priming of said pneumatically operated positive displacement pump.

24. In combination a substantially horizontal frame member having a socket on the first side thereof, a reservoir secured in said socket, a pneumatically operated positive displacement pump mounted on the second side of the frame member, said pump having a suction passageway extending to substantially the bottom of the reservoir, said frame member having a second socket on the first side of the frame member, a second reservoir secured in said second socket, a pneumatic displacement pump having a chamber disposed in the bottom of the second reservoir and having connections extending through the frame member, one of said connections being a discharge connection from the pneumatic pump and the other connection being a return pipe leading into the second reservoir, an air supply pipe between said pumps extending along the second side of said frame member, and means effective subsequent to a discharge operation of said pneumatic displacement pump for controlling the priming of said positive displacement pump.

25. In combination with a machine to be lubricated, a lubricating unit comprising a reservoir and dispensing device for heavy lubricants and a reservoir and dispensing device for light lubricants, a substantially closed pipe-line system connected to the dispensing device for heavy lubricant for distributing the heavy lubricants under pressure to the bearings to be lubricated, an open pipe-line system extending from the light lubricant dispensing device to the bearings in succession and back to the reservoir of the device, means for supplying a charge of compressed air to both devices simultaneously, said open pipe-line system comprising a vent valve for reducing the pressure in the open pipe-line system to atmosphere.

26. In a lubricating system the combination of a reservoir, a pneumatic displacement chamber therein, a delivery pipe therefrom, a pipe-line system connected to the delivery pipe, the return end of the pipe-line system extending into the reservoir, trap basin metering units connected in the pipe-line system, said units having pockets or traps adapted to be filled by gravity from the charge of lubricant propelled through the pipe-line system, and means independent of the return pipe of the pipe-line system for venting the pipe-line system to atmosphere.

27. In combination a reservoir for lubricant a pneumatic displacement chamber in said reservoir, a delivery pipe from said chamber, a pipe-line system connected to said delivery pipe, said pipe-line system having a return pipe for returning the excess of lubricant to the reservoir, a plurality of metering units connected to said pipeline system, said metering units having trap basins adapted to be filled by gravity from a charge of lubricant propelled through the pipe-line system, there being depressions in the pipe-line system between said units, and air venting valves at a plurality of said units for venting air trapped between the depressions in the pipe-line system.

28. In combination a lubricant dispensing system comprising a pneumatically operated positive displacement pump, a lubricant dispensing system comprising a pneumatic displacement pump, a common compressed air connection for said pumps, a reservoir for compressed air, a pressure controlled valve subject to the difference between the pressure in the reservoir and the pressure in said pneumatic displacement pump for periodically connecting the compressed air connections to the reservoir and means effective after a discharge operation of said pneumatic displacement pump to vent a charge of compressed air from said pneumatic displacement pump for controlling the priming of said pneumatically operated positive displacement pump.

29. In combination a frame plate having three sockets from one side thereof, reservoirs secured in said sockets, a pair of pneumatically operated positive displacement pumps disposed on said frame member and having a suction connection extending into the corresponding reservoirs, a pneumatic displacement pump in the third reservoir, an open discharge pipe from the pneumatic displacement pump, a common air connection leading from a source of air under pressure to said three pumps, and means effective after a discharge operation of said pneumatic displacement pump to vent a charge of compressed air therefrom for controlling the priming of said pair of positive displacement pumps.

30. In a multiplex lubricating system the combination of a plurality of lubricating reservoirs, each containing a different lubricant, a lubricant pump connected with a corresponding reservoir, lubricant conduits leading from each pump to its reservoir, a plurality of bearings distributing conduits from the pumps to the bearings and metering units between the last named conduits and the bearings and common pneumatic means in part controlled by the discharge operation of one of said pumps for controlling the priming of the other of said pumps.

31. In a multiplex lubricating system the combination of several lubricant reservoirs, each containing a different lubricant, a lubricant pump connected with each reservoir, lubricant conduits leading from each pump to each reservoir and common fluid pressure operated means under the control of one of said pumps for controlling the priming of the other of said pumps.

32. In a multiplex lubricating system the combination of a plurality of lubricant reservoirs, each containing a different lubricant, a lubricant pump connected with each reservoir, lubricant conduits leading from each pump to its corresponding reservoir, metering units, means connecting said pumps with the metering units and common fluid pressure operated means under the control of one of said pumps for controlling the priming of the other of said pumps.

33. In a multiplex lubricating system the combination of a plurality of lubricant reservoirs, each containing a different lubricant, a lubricant pump connected with a corresponding reservoir, lubricant conduits leading from each pump to its reservoir, a plurality of bearings, distributing conduits from the pumps to the bearings, metering units between the last named conduits and the bearings, and common fluid pressure operated means under the control of one of said pumps for controlling the priming of the other of said pumps.

34. In combination in a pipe line system of the class described a pneumatically operated lubricant dispensing pump having a piston member movable in response to a charge of compressed air for discharging lubricant into a section of said pipe line system having outlets to bearings to be lubricated, a pneumatic displacement pump for forcing lubricant through a different section of said pipe line system having liquid traps for retaining doses of lubricant for the bearings to be lubricated thereby, means for applying a charge of compressed air to both of said pumps in common, and means effective after a discharge operation of said pneumatic displacement pump to vent the charge of compressed air for controlling the priming of said pneumatically operated lubricant dispensing pump by said piston member.

OSCAR U. ZERK.